United States Patent
Lu et al.

(10) Patent No.: US 12,284,686 B2
(45) Date of Patent: Apr. 22, 2025

(54) RANDOM ACCESS METHOD AND APPARATUS AND COMMUNICATION SYSTEM

(71) Applicant: FUJITSU LIMITED, Kawasaki (JP)

(72) Inventors: Yang Lu, Beijing (CN); Guorong Li, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 359 days.

(21) Appl. No.: 17/731,361

(22) Filed: Apr. 28, 2022

(65) Prior Publication Data
US 2022/0256620 A1   Aug. 11, 2022

Related U.S. Application Data

(63) Continuation of application No. PCT/CN2019/116423, filed on Nov. 7, 2019.

(51) Int. Cl.
*H04W 74/0833* (2024.01)
*H04W 56/00* (2009.01)
(Continued)

(52) U.S. Cl.
CPC ..... *H04W 74/0841* (2013.01); *H04W 56/001* (2013.01); *H04W 72/02* (2013.01);
(Continued)

(58) Field of Classification Search
CPC .......... H04W 74/0841; H04W 56/001; H04W 72/02; H04W 72/044; H04W 72/23;
(Continued)

(56) References Cited

U.S. PATENT DOCUMENTS

2019/0261411 A1   8/2019  Chin et al.
2019/0306890 A1   10/2019 Jang et al.
(Continued)

FOREIGN PATENT DOCUMENTS

CN   108282899 A   7/2018
CN   109561489 A   4/2019
(Continued)

OTHER PUBLICATIONS

International Search Report and Written Opinion of the International Searching Authority issued by the China National Intellectual Property Administration for corresponding International Patent Application No. PCT/CN2019/116423, mailed on Aug. 11, 2020, with an English translation.
(Continued)

*Primary Examiner* — Abdullahi Ahmed
(74) *Attorney, Agent, or Firm* — Myers Wolin, LLC

(57) ABSTRACT

A random access apparatus, applicable to a terminal equipment, includes first processor circuitry, wherein the first processor circuitry is configured to determine a random access type according to configuration information of a bandwidth part (BWP) for random access selected by the terminal equipment and downlink reference signal received power measured by the terminal equipment, perform selection of random access resources, and transmit an initial message of random access on the random access resources.

16 Claims, 14 Drawing Sheets

(51) Int. Cl.
  *H04W 72/02* (2009.01)
  *H04W 72/044* (2023.01)
  *H04W 72/23* (2023.01)
  *H04W 74/08* (2009.01)

(52) U.S. Cl.
  CPC ......... *H04W 72/044* (2013.01); *H04W 72/23* (2023.01); *H04W 74/0866* (2013.01)

(58) Field of Classification Search
  CPC .......... H04W 74/0866; H04W 74/0833; H04L 5/0044; H04L 5/005; H04L 5/0053
  See application file for complete search history.

(56) References Cited

U.S. PATENT DOCUMENTS

| | | | |
|---|---|---|---|
| 2019/0350004 A1 | 11/2019 | Zhao et al. | |
| 2020/0252971 A1 | 8/2020 | Wu et al. | |
| 2020/0359420 A1 | 11/2020 | Chen et al. | |
| 2022/0015155 A1* | 1/2022 | Lu | H04W 74/0841 |
| 2022/0053576 A1* | 2/2022 | Lu | H04W 74/0866 |
| 2022/0110170 A1* | 4/2022 | Shi | H04W 74/0841 |
| 2022/0217785 A1* | 7/2022 | Jia | H04W 74/0833 |
| 2022/0225265 A1* | 7/2022 | Jeong | H04W 76/20 |
| 2022/0394781 A1* | 12/2022 | Lu | H04L 5/0053 |
| 2023/0024055 A1* | 1/2023 | Lu | H04W 72/1268 |
| 2023/0232463 A1* | 7/2023 | Agiwal | H04W 72/23 |
| | | | 370/329 |

FOREIGN PATENT DOCUMENTS

| | | |
|---|---|---|
| CN | 109699087 A | 4/2019 |
| CN | 109803439 A | 5/2019 |

OTHER PUBLICATIONS

ZTE Corporation, "Status Report to TSG, NR_2step_RACH", Agenda item:9.4.4, 3GPP TSG RAN meeting #85, RP-191676, Newport Beach, USA, Sep. 16-20, 2019.

Notification of Reasons for Refusal issued by the Japan Patent Office for corresponding Japanese Patent Application No. 2022-524261 mailed on May 9, 2023 with an English translation.

Oppo, "Remaining issues on supporting 2-step RACH configuration on a UL BWP without 4-step RACH resources", Agenda item: 6.13.2, 3GPP TSG-RAN WG2 Meeting #107bis, R2-1912084, Chongqing, China, Oct. 14-18, 2019.

Catt, "Remaining Issue of RA Type Selection", Agenda item: 6.13.5, 3GPP TSG-RAN WG2 Meeting #107bis R2-1912225, Chongqing, China, Oct. 14-18, 2019.

Ericsson, "Procedure for Two-step RACH", Agenda item: 7.2.1.2, 3GPP TSG-RAN WG1 Meeting#98 R1-1910907, Chongqing, China, Oct. 14-18, 2019.

First Notification of Office Action and Search Report issued by the China National Intellectual Property Administration for corresponding Chinese Patent Application No. 201980101810.7, mailed on Sep. 27, 2024, with an English translation.

Notice of Reasons for Refusal issued by the Japan Patent Office for corresponding Japanese Patent Application No. 2023-113365, mailed on Jul. 23, 2024, with an English translation.

Vivo, "Discussion on the 2-step CFRA", Agenda Item: 6.13.6, 3GPP TSG-RAN WG2 Meeting #107bis, R2-1912191, Chongqing, China, Oct. 14-18, 2019.

Ericsson, "2-step CFRA", Agenda Item: 6.13.6, 3GPP TSG-RAN WG2 Ran# 107bis, Tdoc R2-1912681, Chongqing, China, Oct. 14-18, 2019.

ZTE Corporation et al., "Running MAC CR for 2-step RACH", Work item code: NR_2step_RACH-Core, 3GPP TSG-RAN WG2 Meeting #107-bis, R2-1913370, Chongqing, China, Oct. 14-18, 2019.

* cited by examiner

RANDOM ACCESS METHOD AND APPARATUS AND COMMUNICATION SYSTEM

CROSS-REFERENCE TO RELATED APPLICATION

This application is a continuation application of International Application PCT/CN2019/116423 filed on Nov. 7, 2019 and designated the U.S., the entire contents of which are incorporated herein by reference.

TECHNICAL FIELD

This disclosure relates to the field of wireless communication technologies.

BACKGROUND

A random access procedure is a very critical step in mobile communication technologies.

FIG. 1(a) is a flowchart of an existing four-step contention-based random access (CBRA) procedure. As shown in FIG. 1(a), in operation 101, a terminal equipment selects a CBRA preamble, and transmits the preamble via Msg 1 in a contention-based random access occasion (RO) pre-configured by a system; in operation 102, a network device transmits msg2 after receiving the preamble; thus, a random access response (RAR) grants a dedicated uplink PUSCH resource for the terminal equipment transmitting the preamble and allocates a temporary cell radio network temporary identifier (CRNTI) to indicate uplink advance of the physical uplink shared channel (PUSCH); in operation 103, the terminal equipment transmits Msg3 carrying signaling or data on the PUSCH resource; and in operation 104, the network device transmits contention resolution signaling Msg4 for Msg3 to the terminal equipment.

FIG. 1(b) is a flowchart of an existing two-step contention-based random access (CBRA) procedure. As shown in FIG. 1(b), in operation 105, a terminal equipment transmits Msg A, Msg A containing a two-step random access preamble and a payload, and the terminal equipment transmits the preamble of MsgA in the contention RO and transmits signaling or service data of MsgA in a contention physical uplink shared channel (PUSCH) resource; and in operation 106, the network device transmits MsgB after receiving MsgA, thereby transmitting a random access response and a contention resolution message to the terminal equipment.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that with the advancement of technology, types of random access continue to increase. When there are multiple types of random access in communication standards, how to select appropriate types of random access and then determine appropriate random access resources has become an urgent problem needing to be solved.

Embodiments of this disclosure provide a random access method and apparatus and a communication system, in which a random access type is determined according to configuration information of a bandwidth part (BWP) for random access selected by a terminal equipment and downlink reference signal received power measured by the terminal equipment. In this method, an appropriate random access type may be selected, and then an appropriate random access resource may be determined.

According to a first aspect of the embodiments of this disclosure, there is provided a random access method, applicable to a terminal equipment, the method including: determining a random access type according to configuration information of a bandwidth part (BWP) for random access selected by the terminal equipment and downlink reference signal received power measured by the terminal equipment; performing selection of random access resources; and transmitting an initial message of random access on the random access resources.

According to a second aspect of the embodiments of this disclosure, there is provided a random access method, applicable to a network device, the method including: transmitting configuration information of random access of one or more bandwidth parts to a terminal equipment; wherein the configuration information includes two-step random access resources, the two-step random access resources including: a synchronization signal block (SSB) used for two-step random access, a two-step random access preamble, a preamble access occasion for two-step random access, and a physical uplink shared channel (PUSCH) resource for two-step random access.

According to a third aspect of the embodiments of this disclosure, there is provided a random access method, applicable to a terminal equipment, the method including: receiving two-step contention-free random access resource configuration transmitted by a network device; and transmitting a first message (MsgA) of a two-step contention-free random access procedure to the network device, the first message including a two-step contention-free random access preamble and a physical uplink shared channel.

According to a fourth aspect of the embodiments of this disclosure, there is provided a random access method, applicable to a network device, the method including: transmitting a two-step contention-free random access resource configuration to the terminal equipment; and receiving a first message (MsgA) of a two-step contention-free random access procedure from the terminal equipment, the first message including a two-step contention-free random access preamble and a physical uplink shared channel.

According to a fifth aspect of the embodiments of this disclosure, there is provided a random access apparatus, applicable to a terminal equipment, the apparatus executing the random access methods in the first and third aspects of the embodiments of this disclosure.

According to a sixth aspect of the embodiments of this disclosure, there is provided a random access apparatus, applicable to a network device, the apparatus executing the random access methods in the second and fourth aspects of the embodiments of this disclosure.

According to a seventh aspect of the embodiments of this disclosure, there is provided a terminal equipment, including the random access apparatus of the fifth aspect of the embodiments of this disclosure.

According to an eighth aspect of the embodiments of this disclosure, there is provided a network device, including the random access apparatus of the sixth aspect of the embodiments of this disclosure.

According to a ninth aspect of the embodiments of this disclosure, there is provided a communication system, including the terminal equipment of the seventh aspect of the embodiments and the network device of the eighth aspect of the embodiments of this disclosure.

According to a tenth aspect of the embodiments of this disclosure, there is provided a computer readable program, which, when executed in a random access apparatus or a terminal equipment, will cause the random access apparatus or the terminal equipment to carry out the random access method as described in the first and the third aspects of the embodiments of this disclosure.

According to an eleventh aspect of the embodiments of this disclosure, there is provided a computer storage medium, including a computer readable program, which will cause a random access apparatus or a terminal equipment to carry out the random access method as described in the first and the third aspects of the embodiments of this disclosure.

According to a twelfth aspect of the embodiments of this disclosure, there is provided a computer readable program, which, when executed in a random access apparatus or a network device, will cause the random access apparatus or the network device to carry out the random access method as described in the second and the fourth aspects of the embodiments of this disclosure.

According to a thirteenth aspect of the embodiments of this disclosure, there is provided a computer storage medium, including a computer readable program code, which will cause a random access apparatus or a network device to carry out the random access method as described in the second and the fourth aspects of the embodiments of this disclosure.

An advantage of the embodiments of this disclosure exists in that a random access type is determined according to configuration information of a bandwidth part (BWP) for random access selected by a terminal equipment and downlink reference signal received power measured by the terminal equipment. Hence, an appropriate random access type may be selected, and then an appropriate random access resource may be determined.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1A:
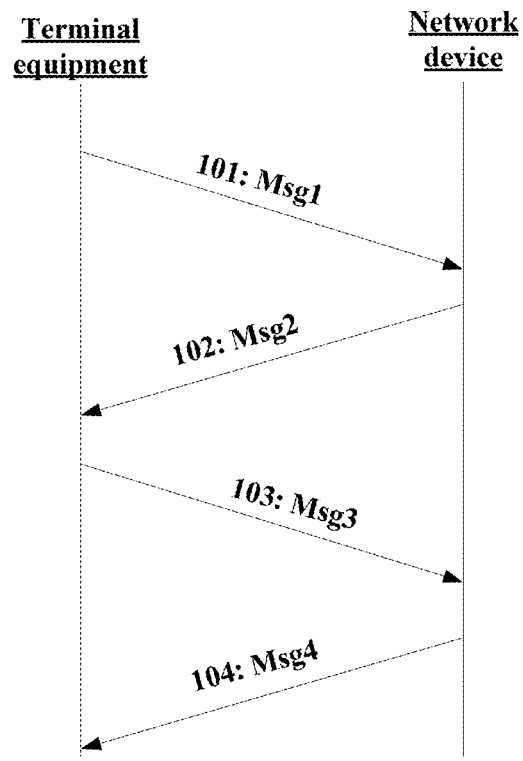
FIG. 1(a) is a flowchart of an existing four-step contention-based random access procedure.
Figure 1B:
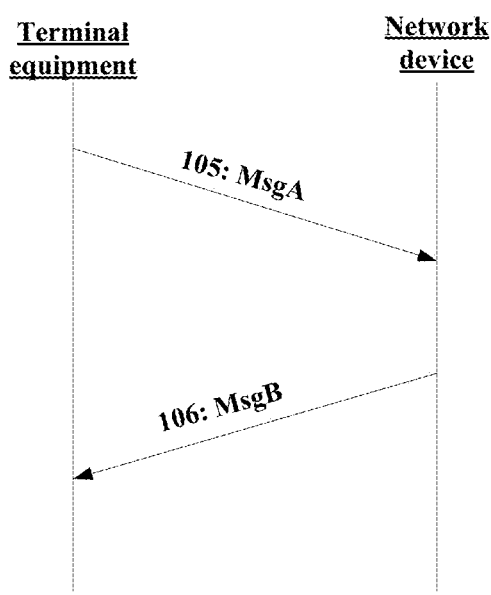
FIG. 1(b) is a flowchart of an existing two-step contention-based random access procedure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1 G (genescalen), 2 G, 2.5 G, 2.75 G, 3 G, 4 G, 4.5 G, and 5 G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5 G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Figure 2A:
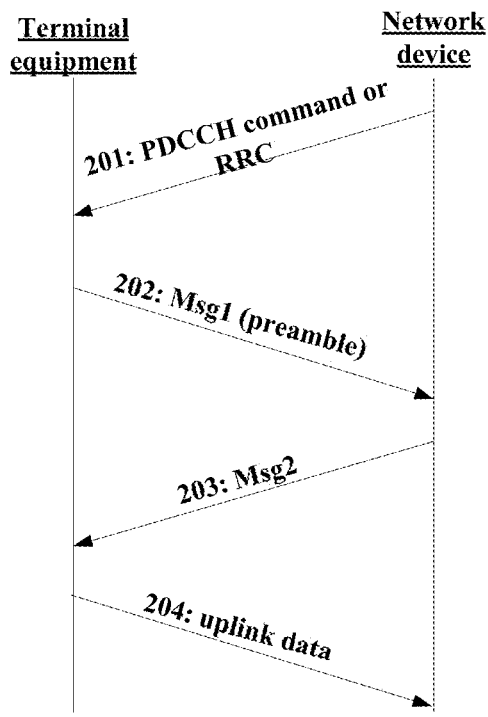
FIG. 2(a) is a flowchart of a contention-free random access procedure.

In the embodiments of this disclosure, a contention-free random access (CFRA) procedure and a two-step contention-free random access (two-step CFRA) procedure are involved. FIG. 2(a) is a flowchart of a contention-free random access procedure, and FIG. 2(b) is a flowchart of a two-step contention-free random access procedure As shown in FIG. 2(a), the contention-free random access procedure may include the following operations: operation 201: configuring dedicated preambles by a network device for a terminal device via a radio resource control (RRC) message or a physical downlink control channel (PDCCH) command, wherein the dedicated preambles may be configured on multiple synchronization signal blocks/channel state information (SSB/CSI) respectively; operation 202: selecting an SSB/CSI by the terminal device in initiating random access and transmitting the dedicated preambles via Mag1; operation 203: transmitting a random access response by the network device to the terminal device via Msg2 after receiving the dedicated preambles; operation 204: transmitting uplink data or signaling by the terminal device in a uplink grant included in the random access response.

Figure 2B:
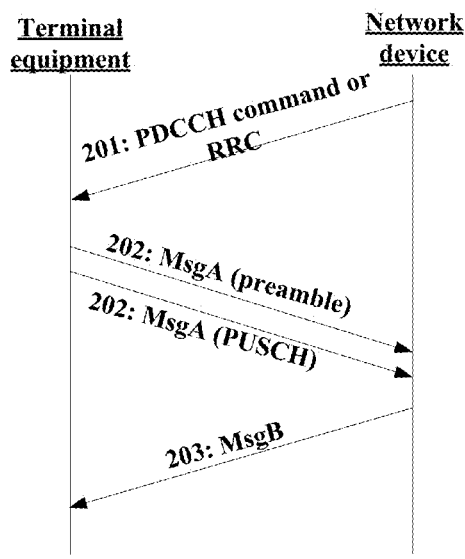
FIG. 2(b) is a flowchart of a two-step contention-free random access procedure.

As shown in FIG. 2(b), the two-step contention-free random access procedure may include the following operations: operation 205: configuring dedicated two-step random access preambles by the network device for the terminal device via a radio resource control (RRC) message or a physical downlink control channel (PDCCH) command; operation 206: selecting an SSB/CSI by the terminal device in initiating random access, and transmitting the dedicated preambles and physical uplink shared channels (PUSCHs) via MsgA; operation 207: transmitting a random access response by the network device to the terminal device via MsgB. In the two-step contention-free random access procedure, the PUSCHs and the dedicated preambles are transmitted in operation 206, thereby reducing transmission latency of the PUSCHs.

In the embodiments of this disclosure, the dedicated two-step random access preamble may also be referred to as a two-step contention-free random access preamble, and both of them have the same meaning.

A scenario of an embodiment of this disclosure shall be described below by way of an example; however, this disclosure is not limited thereto.

Figure 3:
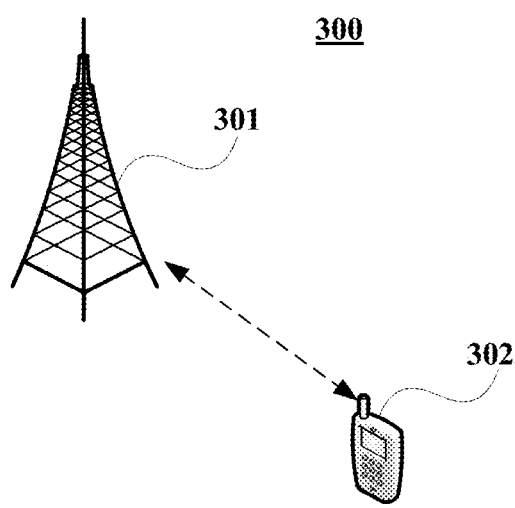
FIG. 3 is a schematic diagram of a communication system of an embodiment of this disclosure

FIG. 3 is a schematic diagram of a communication system of an embodiment of this disclosure, in which a case where a terminal equipment and a network device are taken as examples is schematically shown. As shown in FIG. 3, a communication system 300 may include a network device 301 and a terminal equipment 302 (for the sake of simplicity, an example having only one terminal equipment is schematically given in FIG. 3).

In the embodiment of this disclosure, existing traffics or traffics that may be implemented in the future may be performed between the network device 301 and the terminal equipment 302. For example, such traffics may include but not limited to enhanced mobile broadband (eMBB), massive machine type communication (mMTC), and ultra-reliable and low-latency communication (URLLC), etc.

The terminal equipment 302 may transmit data to the network device 301, such as in a grant-free manner. The network device 301 may receive data transmitted by one or more terminal equipments 302, and feed back information to the terminal equipment 302 (such as acknowledgement (ACK) information/non-acknowledgement (NACK) information), and the terminal equipment 302 may acknowledge to terminate a transmission process, or may perform transmission of new data, or may perform data retransmission.

Following description shall be given by taking that a network device is a receiver end and a terminal equipment is a transmitter end in a communication system as an example. However, this disclosure is not limited thereto, and the transmitter end and/or the receiver end may also be other devices. For example, this disclosure is applicable to not only uplink grant-free transmission between a network device and a terminal device, but also sidelink grant-free transmission between two terminal equipments.

Embodiment of a First Aspect

The embodiment of the first aspect of this disclosure relates to a random access method, applicable to a terminal equipment, such as the terminal device 302.

Figure 4:
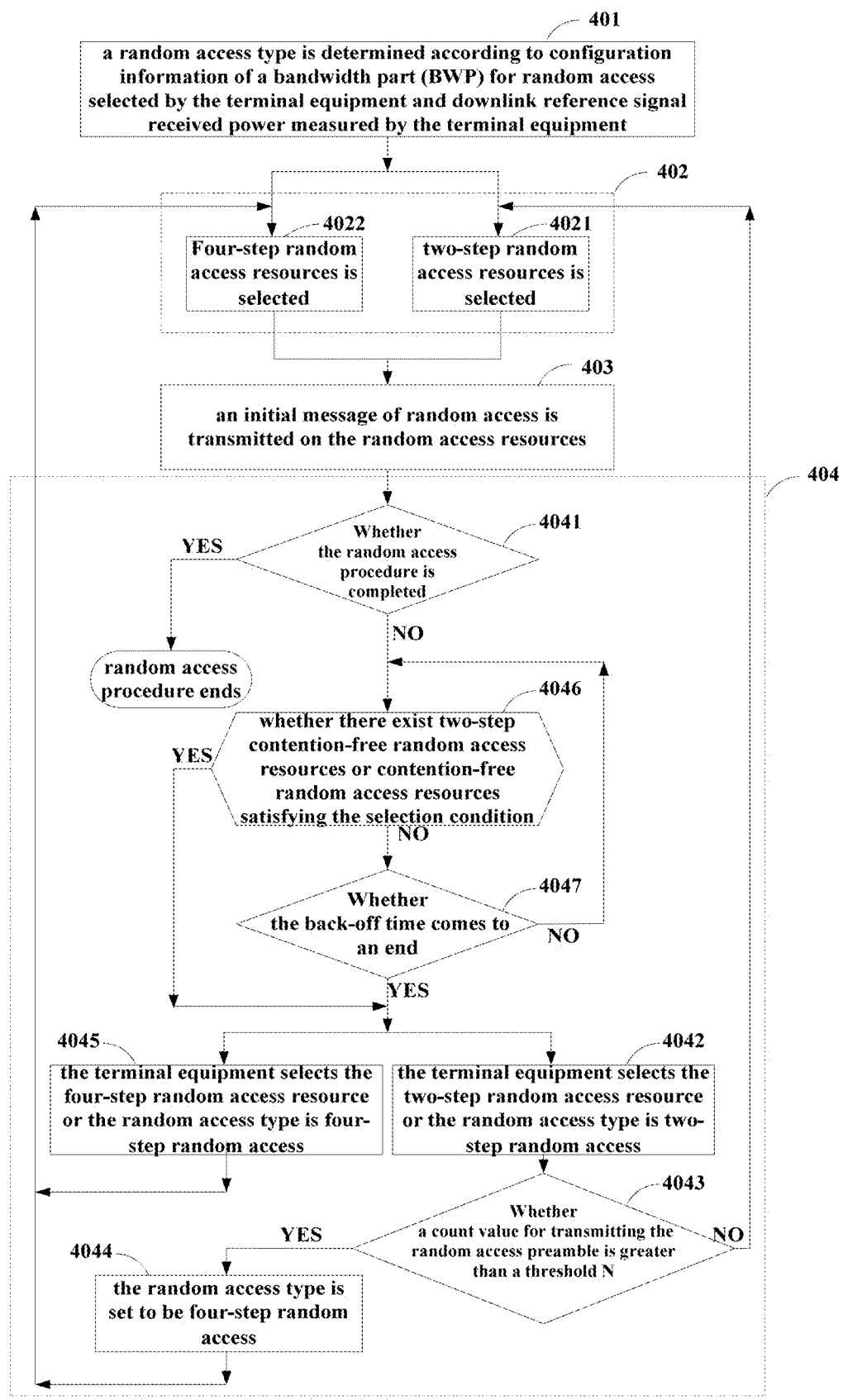
FIG. 4 is a schematic diagram of the random access method of the first aspect of the embodiments of this disclosure.

FIG. 4 is a schematic diagram of the random access method of the first aspect of the embodiments of this disclosure. As shown in FIG. 4, the random access method may include: operation 401: a random access type is determined according to configuration information of a bandwidth part (BWP) for random access selected by the terminal equipment and downlink reference signal received power measured by the terminal equipment;

operation 402: selection of random access resources is performed; and operation 403: an initial message of random access is transmitted on the random access resources.

In the embodiment of the first aspect of this disclosure, the random access type is determined according to the configuration information of a bandwidth part (BWP) for random access selected by the terminal equipment and the downlink reference signal received power measured by the terminal equipment. Hence, an appropriate random access type may be selected, and then an appropriate random access resource may be determined.

In operation 401, in a case where the bandwidth part (BWP) selected by the terminal equipment is configured with two-step random access resources and the downlink reference signal received power measured by the terminal equipment is higher than a first threshold, the random access type is determined as two-step random access, or in a case where the bandwidth part (BWP) selected by the terminal equipment is only configured with two-step random access resources, the random access type is determined as two-step random access; otherwise, the random access type is determined as four-step random access.

In at least one embodiment, in operation 401, the two-step random access resources configured for the bandwidth part (BWP) selected by the terminal equipment include: a synchronization signal block (SSB) for two-step random access, a two-step random access preamble, a preamble access occasion of two-step random access, and a physical uplink shared channel (PUSCH) resource of two-step random access.

In at least one embodiment, the first threshold is a measurement threshold parameter based on a synchronization signal block (SSB) and configured by radio resource control (RRC) signaling.

In at least one embodiment, if a serving cell is configured with different uplink carriers, the terminal adopts the measurement threshold to which an uplink carrier corresponds. That is, when the terminal equipment selects a supplementary uplink (SUL) carrier of the serving cell for performing random access, the first threshold is a first threshold of the supplementary uplink; and when the terminal equipment selects a normal uplink (NUL) carrier of the serving cell for performing random access, the first threshold is a first threshold of the normal uplink. The first thresholds to which the SUL carrier and the NUL carrier correspond are respectively configured by radio resource control (RRC) signaling.

In at least one embodiment, after the random access type is determined to be two-step random access in operation 401, two-step random access resource selection is performed in operation 402, that is, operation 4021 is performed; after the random access type is determined to be four-step random access in operation 401, four-step random access resource selection is performed in operation 402, that is, operation 4022 is performed.

In operation 403, the random access initial message transmitted by the terminal equipment on the random access resource is first message MsgA or Msg1. For example, in operation 402, if the terminal equipment selects the two-step random access resource, it transmits the first message MsgA, and if it selects the four-step random access resource, it transmits Msg1, i.e. a four-step random access preamble.

Figure 5:
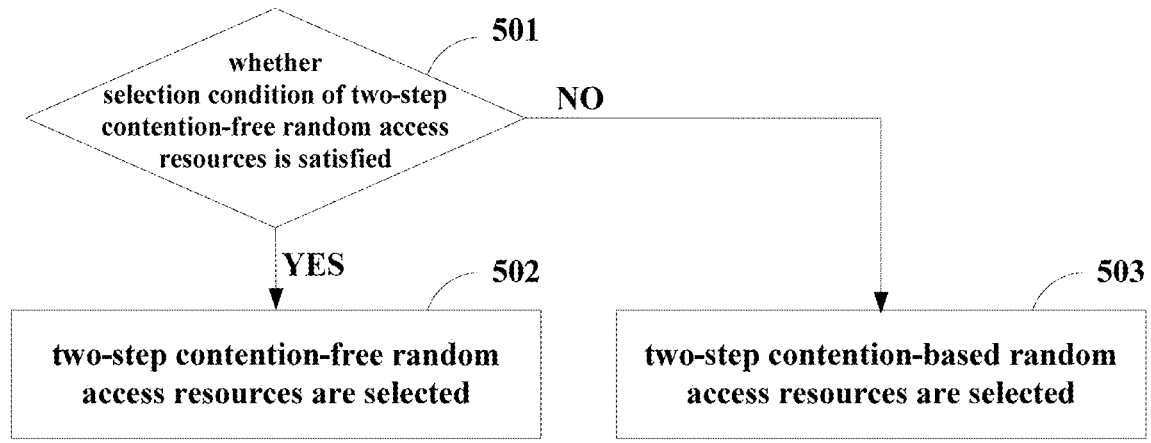
FIG. 5 is a schematic diagram of an implementation of performing selection of two-step random access resources.

FIG. 5 is a schematic diagram of an implementation of performing selection of two-step random access resources. As shown in FIG. 5, the performing selection of two-step random access resources (i.e. operation 4021) may include the following operations:

operation 501: it is determined whether a selection condition of the two-step contention-free random access resources is satisfied, entering into operation 502 if it is determined "yes", and entering into operation 503 if it is determined "no";

operation 502: two-step contention-free random access resources are selected; and operation 503: two-step contention-based random access resources are selected.

Figure 6:
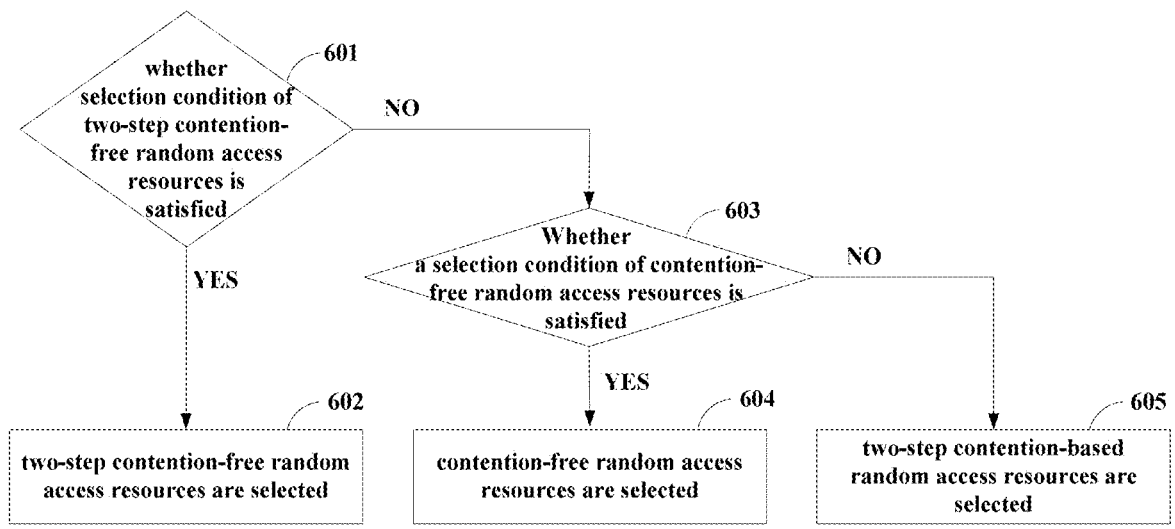
FIG. 6 is a schematic diagram of another implementation of performing selection of two-step random access resources.

FIG. 6 is a schematic diagram of another implementation of performing selection of two-step random access resources. As shown in FIG. 6, the performing selection of two-step random access resources (i.e. operation 4021) may include the following operations:

operation 601: it is determined whether a selection condition of the two-step contention-free random access resources is satisfied, entering into operation 602 if it is determined "yes", and entering into operation 603 if it is determined "no";

operation 602: two-step contention-free random access resources are selected;

operation 603: it is determined whether a selection condition of contention-free random access resources is satisfied, entering into operation 604 if it is determined "yes", and entering into operation 605 if it is determined "no";

operation 604: contention-free random access resources are selected; and operation 605: two-step contention-based random access resources are selected.

It should be noted that when two-step random access resource selection is performed in operation 402, two-step random access resources are not necessarily selected. For example, in operation 604, contention-free random access resources are selected.

Figure 7:
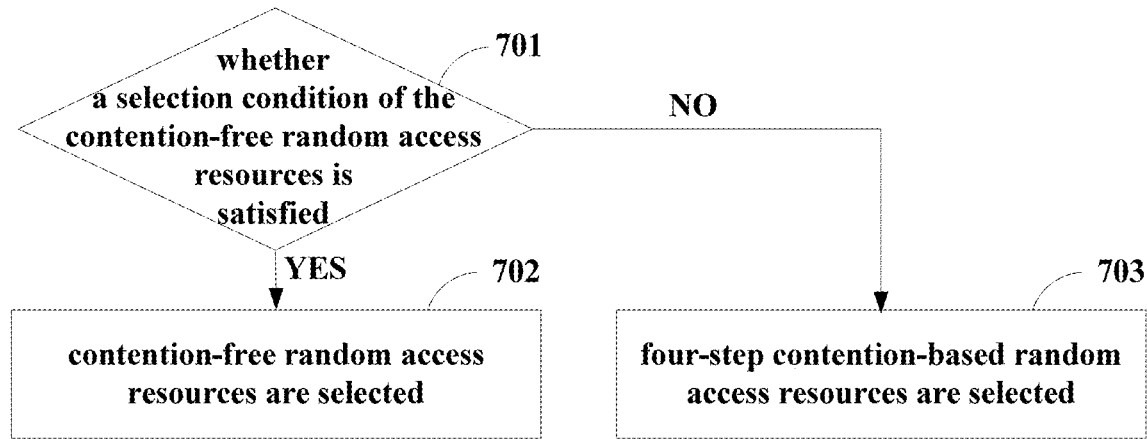
FIG. 7 is a schematic diagram of an implementation of performing selection of four-step random access resources.

FIG. 7 is a schematic diagram of an implementation of performing selection of four-step random access resources. As shown in FIG. 7, the performing selection of four-step random access resources (i.e. operation 4022) may include the following operations:

operation 701: it is determined whether a selection condition of the contention-free random access resources is satisfied, entering into operation 702 if it is determined "yes", and entering into operation 703 if it is determined "no";

operation 702: contention-free random access resources are selected; and operation 703: four-step contention-based random access resources are selected.

Figure 8:
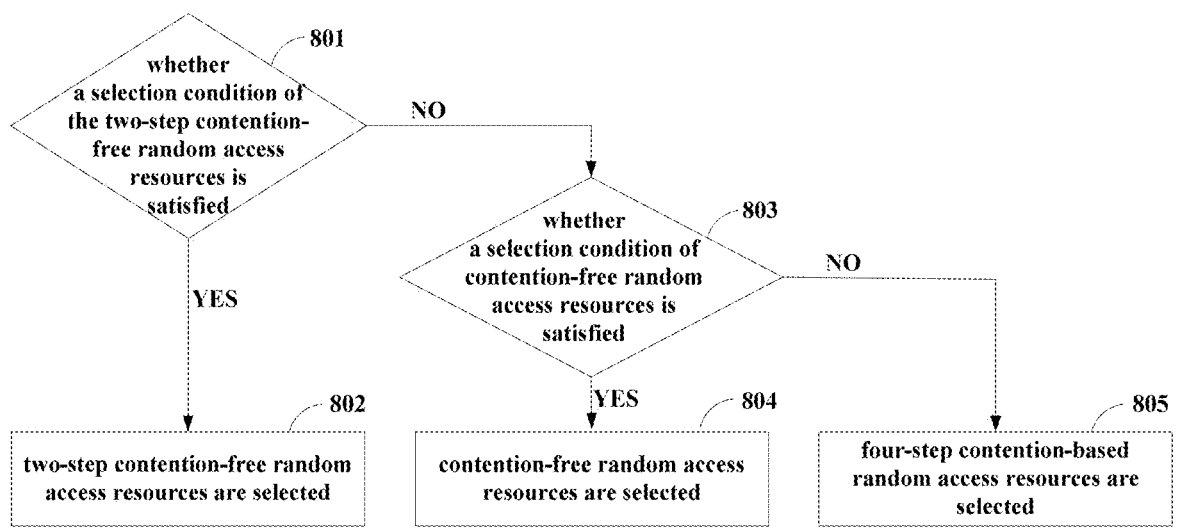
FIG. 8 is a schematic diagram of another implementation of performing selection of four-step random access resources.

FIG. 8 is a schematic diagram of another implementation of performing selection of four-step random access resources. As shown in FIG. 8, the performing selection of four-step random access resources (i.e. operation 4022) may include the following operations:

operation 801: it is determined whether a selection condition of the two-step contention-free random access resources is satisfied, entering into operation 802 if it is determined "yes", and entering into operation 803 if it is determined "no";

operation 802: two-step contention-free random access resources are selected;

operation 803: it is determined whether a selection condition of contention-free random access resources is satisfied, entering into operation 804 if it is determined "yes", and entering into operation 805 if it is determined "no";

operation 804: contention-free random access resources are selected; and operation 805: four-step contention-based random access resources are selected.

It should be noted that when four-step random access resource selection is performed in operation 402, four-step random access resources are not necessarily selected. For example, in operation 804, contention-free random access resources are selected, and in operation 702 and 802, two-step contention-free random access resources are selected.

In the above operation 501, operation 601 and operation 801, that a selection condition of the two-step contention-free random access resources is satisfied includes: the terminal equipment is configured with a dedicated two-step random access resource by the network device, and reference signal received power (RSRP) of at least one synchronization signal block (SSB) or channel state information reference signal (CSI-RS) in the dedicated two-step random access resource is higher than a second threshold. The dedicated two-step random access resource includes: at least one synchronization signal block (SSB) or channel state information reference signal (CSI-RS) and a dedicated two-step random access preamble to which the synchronization signal block (SSB) or channel state information reference signal (CSI-RS) corresponds.

Figure 9:
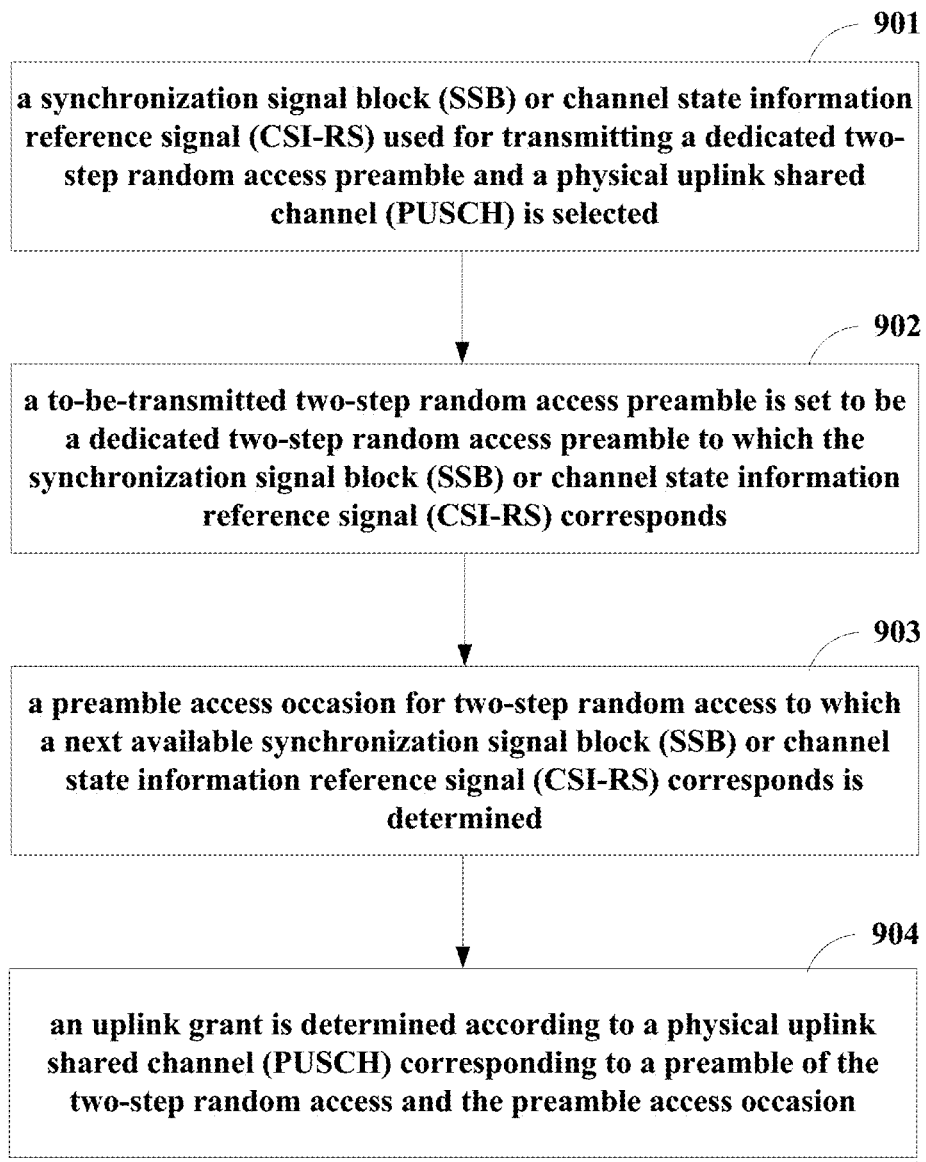
FIG. 9 is a schematic diagram of an implementation of selecting two-step contention-free random access resources.

In the above operation 502, operation 602 and operation 802, a two-step contention-free random access resource is selected. FIG. 9 is a schematic diagram of an implementation of selecting two-step contention-free random access resources. As shown in FIG. 9, the operation of selecting two-step contention-free random access resources includes:

operation 901: a synchronization signal block (SSB) or channel state information reference signal (CSI-RS) used for transmitting a dedicated two-step random access preamble and a physical uplink shared channel (PUSCH) is selected;

operation 902: a to-be-transmitted two-step random access preamble is set to be a dedicated two-step random access preamble to which the synchronization signal block (SSB) or channel state information reference signal (CSI-RS) corresponds;

operation 903: a preamble access occasion for two-step random access to which a next available synchronization signal block (SSB) or channel state information reference signal (CSI-RS) corresponds is determined; and operation 904: an uplink grant is determined according to a physical uplink shared channel (PUSCH) corresponding to a preamble of the two-step random access and the preamble access occasion.

In operation 901, the terminal equipment selects a synchronization signal block (SSB) or channel state information reference signal (CSI-RS) with reference signal received power (RSRP) higher than the second threshold.

In operation 902, if the synchronization signal block (SSB) or channel state information reference signal (CSI-RS) is configured with a dedicated two-step random access preamble corresponding to group A and group B, the terminal equipment selects a dedicated two-step random access preamble in group A or group B according to a pathloss and/or a transport block size (TB size) of the first message (MsgA) of the two-step contention-free random access procedure, wherein modulation and coding schemes (MCSs) of physical uplink shared channels (PUSCHs) to which the dedicated two-step random access preambles of group A and group B correspond are different. Hence, the terminal equipment selects a physical uplink shared channel (PUSCH) with a reasonable modulation and coding scheme (MCS) to transmit.

For example, if a pathloss measured by the terminal equipment 302 is less than a pathloss threshold and the transport block size (TB Size) of the first message (MsgA) is greater than the transport block size threshold, a two-step random access preamble to be transmitted by the terminal equipment 302 is set to be a dedicated two-step random access preamble of group B; otherwise, the two-step random access preamble to be transmitted is set to be a dedicated two-step random access preamble of group A.

For another example, if the pathloss measured by the terminal equipment 302 is less than the pathloss threshold, a two-step random access preamble to be transmitted by the terminal equipment 302 is set to be a dedicated two-step random access preamble of group B; otherwise, the two-step random access preamble to be transmitted is set to be a dedicated two-step random access preamble of group A.

The transport block size threshold may be, for example, the following parameter: a group A size of random access MsgA (ra-MsgASizeGroupA). The pathloss threshold may be calculated, for example, by using a formula as below:

Pathloss threshold=PCMAX−preambleReceivedTargetPower−msg*A*-DeltaPreamble−messagePowerOffsetGroup*B*;

where, preambleReceivedTargetPower is target received power of the two-step contention-based random access preamble, msgA-DeltaPreamble is an offset value of target received power of MsgA and target received power of the preamble, messagePowerOffsetGroupB is a power offset for selecting a preamble group, and PCMAX is a maximum transmit power (Pcmax) of the terminal equipment 302 in performing random access.

In operation 904, the determined uplink grant (UL grant) may include: a modulation and coding scheme (MCS), an uplink (UL) resource, or a transport block size (TB size), etc.

As shown in FIG. 4, in at least one embodiment, after operation 403, the method further includes:

operation 404: random access resource selection is performed again if the random access procedure is not completed (i.e. turning back to operation 402).

As shown in FIG. 4, operation 404 may include the following operations:

operation 4041: it is determined whether the random access procedure is completed, and if the random access procedure is not completed (it is determined "No"), turning back to operation 402, and performing the random access resource selection again.

In operation 4041, whether the random access is completed is determined for the random access resource selected in operation 402. For example, if the two-step contention-free random access resource is selected in operation 402, in operation 4041, that the random access is not completed may include: not receiving the second message (MsgB) after transmission of the first message (MsgA) of the two-step contention-free random access is completed and before an end of a two-step contention-free random access response receiving window (ra-ResponseWindowtwo-step).

In this disclosure, in turning back from operation 4041 to operation 402, it may enter into operation 4021 of operation 402 or enter into operation 4022 of operation 402.

As shown in FIG. 4, operation 404 may further include the following operation:

operation 4042: the two-step random access resource is performed selection again if the terminal equipment selects the two-step random access resource or if the random access type is two-step random access (that is, turning back to operation 4021 in operation 402).

That the terminal equipment selects a two-step random access resource may be, for example, selecting a two-step contention-based random access resource or a two-step contention-free random access resource by the terminal equipment 302 in operation 402. That the random access type is two-step random access may be, for example, the random access type determined by the terminal equipment 302 in operation 401 is two-step random access. Therefore, the random access resource selected by the terminal equipment 302 in operation 4021 may be a two-step contention-based random access resource, or a two-step contention-free random access resources, or a contention-free random access resource.

As shown in FIG. 4, after operation 4042, operation 404 may further include the following operations:

operation 4043: it is determined whether a count value for transmitting the random access preamble is greater than a threshold N in a case where the random access procedure is not completed, entering into operation 4044 if the count value of the preamble is greater than the threshold N (that is, a result of determination is "yes"), and entering into operation 4021 if the count value of the preamble is less than or equal to the threshold N (that is, the result of determination is "no"), so as to perform two-step random access resource selection; and operation 4044: the random access type is set to be four-step random access, and entering into operation 4022 to perform four-step random access resource selection.

In operation 4043, the count value is used to record the number of times of transmission of the two-step random access preamble; for example, if the terminal equipment selects a two-step random access resource or a two-step contention-free random access resource, the count value is increased; or, the count value is used to record the number of times of transmission of the preamble when the terminal equipment determines that the random access type is two-step random access.

With operations 4043 and 4044, the random access type may be adjusted in time, thereby improving efficiency of random access.

As shown in FIG. 4, operation 404 may further include the following operation:

operation 4045: the four-step random access resource selection is performed again if the terminal equipment selects the four-step random access resource or if the random access type is four-step random access.

That the terminal equipment selects the four-step random access resource may be, for example, that the terminal equipment 302 selects the four-step contention random access resource in operation 402. That the random access type is four-step random access may be, for example, the random access type determined by the terminal equipment 302 in operation 401 is four-step random access, and the random access resource selected by the terminal equipment 302 in operation 4022 may be a two-step contention-free random access resource, or a contention-free random access resource, or a four-step contention random access resource.

As shown in FIG. 4, operation 404 may further include operation 4046 and operation 4047, which are before operation 4042 and operation 4045.

Operations 4046 and 4047 are as follows:

operation 4046: it is determined whether there exist two-step contention-free random access resources or contention-free random access resources satisfying the selection condition within a backoff time, selection of random access resources is performed again before the end of the backoff time if it is determined "yes" (that is, there exist contention-free random access resources satisfying the selection condition within the backoff time)(i.e. executing operation 4042 or operation 4045), and selection of random access resources is performed again after the end of the backoff time if it is determined "no" (that is, there exist no contention-free random access resource satisfying the selection condition within the backoff time)(i.e. executing operation 4042 or operation 4045); and operation 4047: it is determined whether the back-off time comes to an end, performing random access resource selection again if it is determined "yes" (that is, the back-off time comes to an end) (i.e. executing operation 4042 or operation 4045), and turning back to operation 4046 if it is determined "yes" (that is, the back-off time does not come to an end).

In operation 4046, the two-step contention-free random access resources satisfying the selection condition refers to, for example, that the terminal equipment is provided with dedicated two-step random access resources, and reference signal received power (RSRP) of at least one SSB or CSI-RS is higher than the second threshold.

In operation 4047, the backoff time is a value randomly selected between 0 and a backoff parameter, and the backoff parameter is a two-step random access preamble backoff parameter (PREAMBLE BACKOFF two-step), for example, the backoff parameter is indicated by a backoff indication (BI) field in MsgB.

With operation 4046 and operation 4047, if the random access is not successfully completed, the terminal equipment may perform random access again according to a backoff indication of a network after a period of time of random backoff, which may effectively control a access load of the network, and also, the terminal equipment may be enabled to preferentially select two-step contention-free random access resources or contention-free random access resources to perform access, thereby improving efficiency of random access.

In the first aspect of the embodiments of this disclosure, the terminal equipment is able to select an appropriate random access type and then determine appropriate random access resources, thereby improving efficiency of random access.

Embodiment of a Second Aspect

The second aspect of the embodiments of this disclosure relates to a random access method, applicable to a network device, such as the network device 301.

Figure 10:
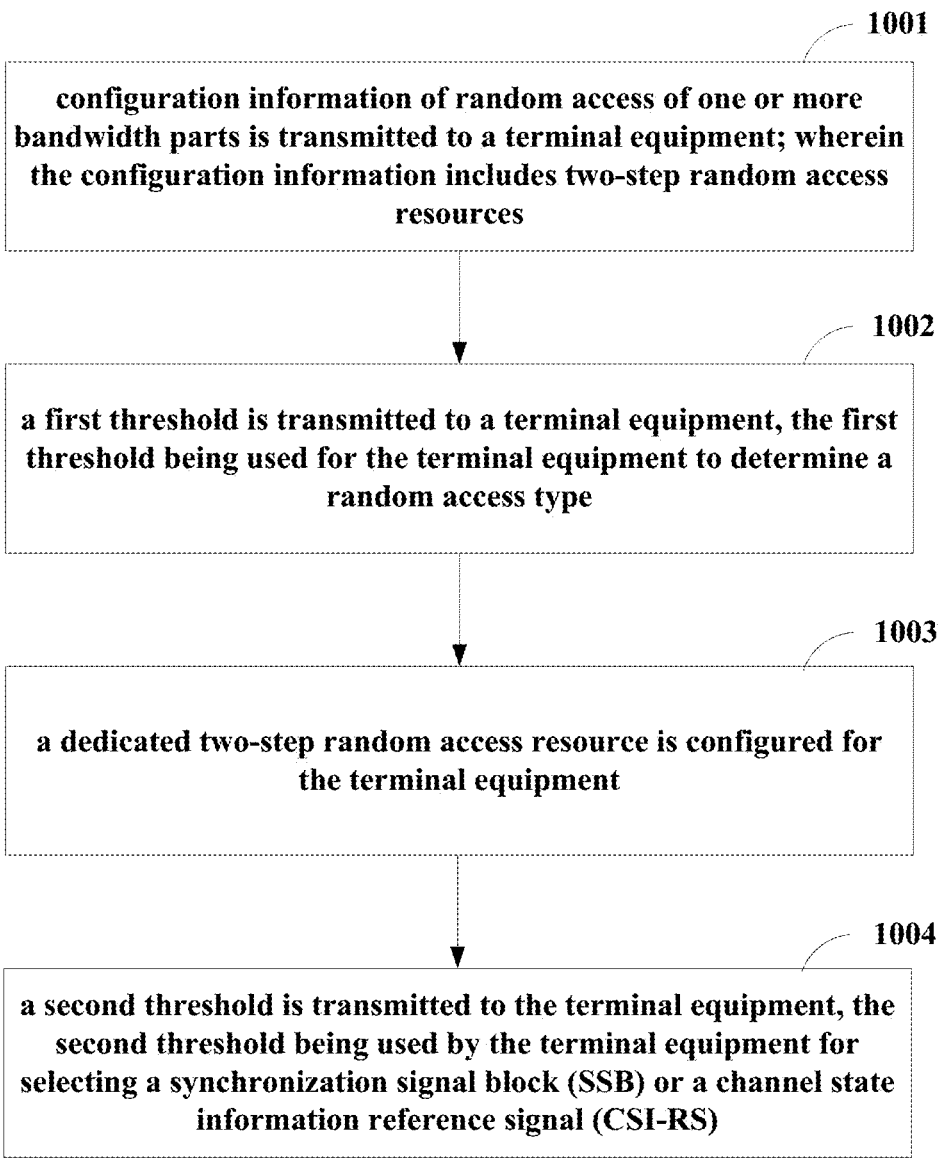
FIG. 10 is a schematic diagram of the random access method of the second aspect of the embodiments of this disclosure.

FIG. 10 is a schematic diagram of the random access method of the second aspect of the embodiments of this disclosure. As shown in FIG. 10, the random access method may include:
  operation 1001: configuration information of random access of one or more bandwidth parts is transmitted to a terminal equipment; wherein the configuration information includes two-step random access resources.

In operation 1001, the two-step random access resources include: a synchronization signal block (SSB) used for two-step random access, a two-step random access preamble, a preamble access occasion for two-step random access, and a physical uplink shared channel (PUSCH) resource for two-step random access; wherein the two-step random access resources may be transmitted via a system broadcast message of RRC.

As shown in FIG. 10, the method further includes:
  operation 1002: a first threshold is transmitted to a terminal equipment, the first threshold being used for the terminal equipment to determine a random access type.

In operation 1002, the first threshold includes a first threshold of a supplementary uplink (SUL), or a first threshold of a normal uplink (NUL).

As shown in FIG. 10, the method further includes:
  operation 1003: a dedicated two-step random access resource is configured for the terminal equipment.

The dedicated two-step random access resource includes at least one synchronization signal block (SSB) or channel state information reference signal (CSI-RS) and a dedicated two-step random access preamble to which the synchronization signal block (SSB) or channel state information reference signal (CSI-RS)) corresponds. The network device may configure that the dedicated two-step random access preamble to which the SSB or CSI-RS corresponds as a preamble of group A or group B, and MCSs of PUSCHs to which the preambles of group A and group B correspond are different. For example, during handover, according to measurement signal power or quality based on an SSB or CSI-RS of the terminal equipment for a target base station, the network device configures the terminal equipment with at least one SSB or CSI-RS for access to the target base station, and according to the measurement signal power or quality of the terminal equipment for the SSB or CSI-RS, configures the terminal equipment with a dedicated two-step random access preamble of group A or group B. In this way, as the MCSs of the PUSCHs to which the preambles of group A and group B correspond are different, it is beneficial for the terminal to use an appropriate MCS to transmit a PUSCH under different channel quality conditions.

As shown in FIG. 10, the method further includes:
  operation 1004: a second threshold is transmitted to the terminal equipment, the second threshold being used by the terminal equipment for selecting a synchronization signal block (SSB) or a channel state information reference signal (CSI-RS).

In operation 1004, the synchronization signal block (SSB) or channel state information reference signal (CSI-RS) is configured with dedicated two-step random access preambles corresponding to group A and group B. Modulation and coding schemes (MCSs) of physical uplink shared channels (PUSCHs) to which the dedicated two-step random access preambles of group A and group B correspond are different. For example, during handover, according to measurement signal power or quality based on an SSB or CSI-RS of the terminal equipment for a target base station, the network device configures the terminal equipment with at least one SSB or CSI-RS for access to the target base station, and simultaneous configures dedicated two-step random access preambles of group A or group B for the terminal equipment. In this way, the terminal equipment autonomously selects the two-step random access preambles of group A or group B according to a situation (such as according to quality of a signal between it and the target base station), and as the MCSs of the PUSCHs to which the preambles of group A and group B correspond are different, it is beneficial for the terminal to use an appropriate MCS to transmit a PUSCH under different channel quality conditions (such as under conditions of different channel quality).

In the second aspect of the embodiments of this disclosure, the terminal equipment is able to select an appropriate random access type according to information transmitted by the network device and then determine appropriate random access resources, thereby improving efficiency of random access.

Embodiment of a Third Aspect

The third aspect of the embodiments of this disclosure relates to a random access method, applicable to a terminal equipment, such as the terminal equipment 302. The terminal equipment 302 initiates a random access request to the network device 301 and receives a random access response transmitted by the network device 301.

The random access method of the third aspect of the embodiments of this disclosure relates to operations performed by a terminal equipment in a two-step contention-free random access procedure.

Figure 11:
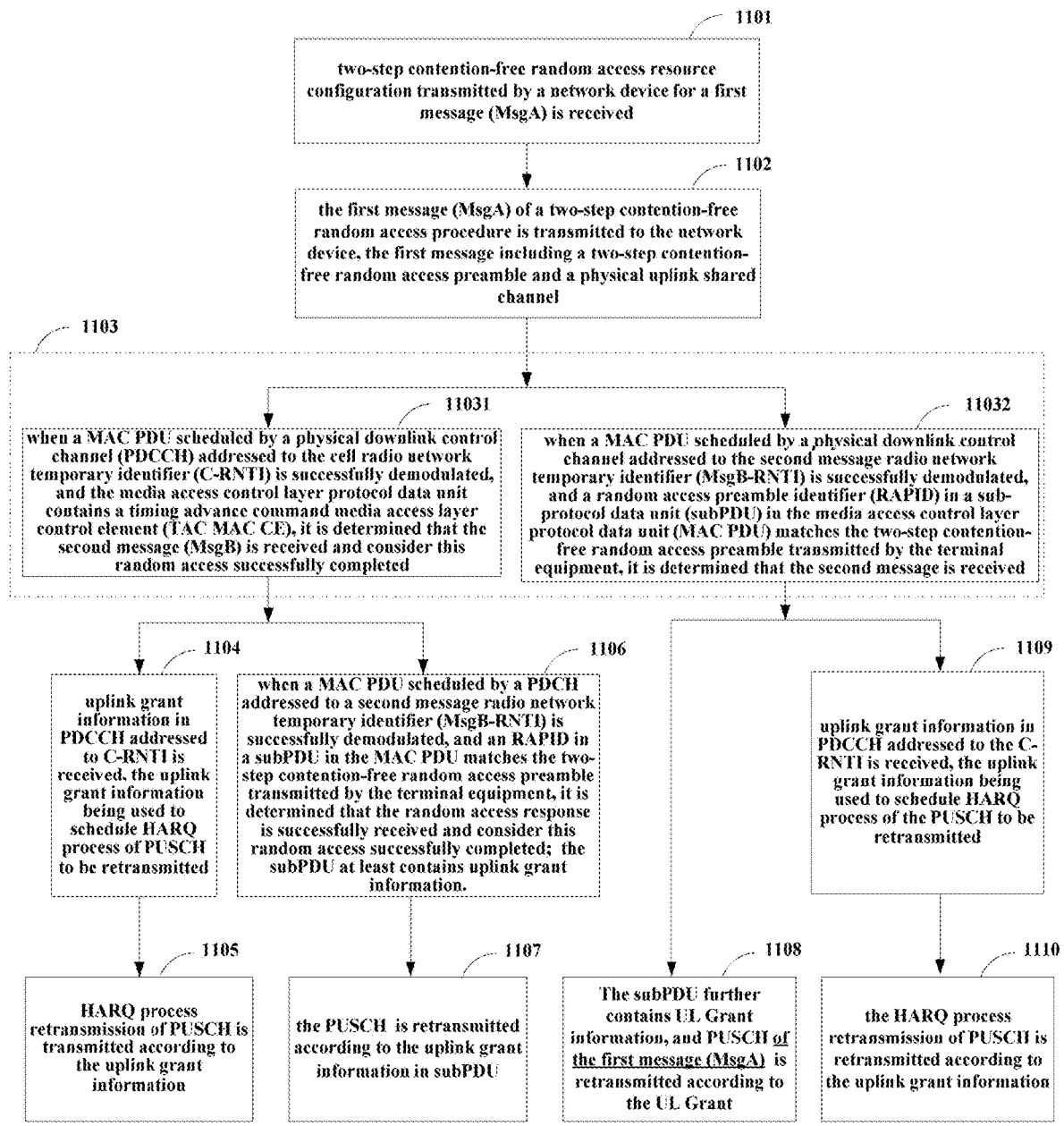
FIG. 11 is a schematic diagram of the random access method of the third aspect of the embodiments of this disclosure.

FIG. 11 is a schematic diagram of the random access method of the third aspect of the embodiments of this disclosure. As shown in FIG. 11, the random access method may include:
  operation 1101: two-step contention-free random access resource configuration transmitted by a network device for a first message (MsgA) is received; and operation 1102: the first message (MsgA) of a two-step contention-free random access procedure is transmitted to the network device, the first message including a two-step contention-free random access preamble and a physical uplink shared channel.

According to the third aspect of the embodiments of this disclosure, the first message (MsgA) transmitted by the terminal equipment to the network device includes a two-step contention-free random access preamble and a physical uplink shared channel (PUSCH), thereby reducing transmission latency of the physical uplink shared channel (PUSCH).

In at least one embodiment, in operation 1101, the terminal equipment may receive two-step contention-free random access resource configuration via the physical downlink control channel (PDCCH) or radio resource control (RRC) signaling, wherein the two-step contention-free random access resource configuration may be information used for configuring a two-step contention-free random access resource for the terminal equipment.

In at least one embodiment, the two-step contention-free random access resources include a dedicated two-step random access resource, wherein the dedicated two-step random access resources may include: at least one synchronization signal block (SSB) or channel state information reference signal (CSI-RS), and a dedicated two-step random access preamble to which the synchronization signal block (SSB) or channel state information reference signal (CSI-RS) corresponds. The dedicated two-step random access preamble is the two-step contention-free random access preamble included in the first message (MsgA) in operation 1102.

Figure 12:
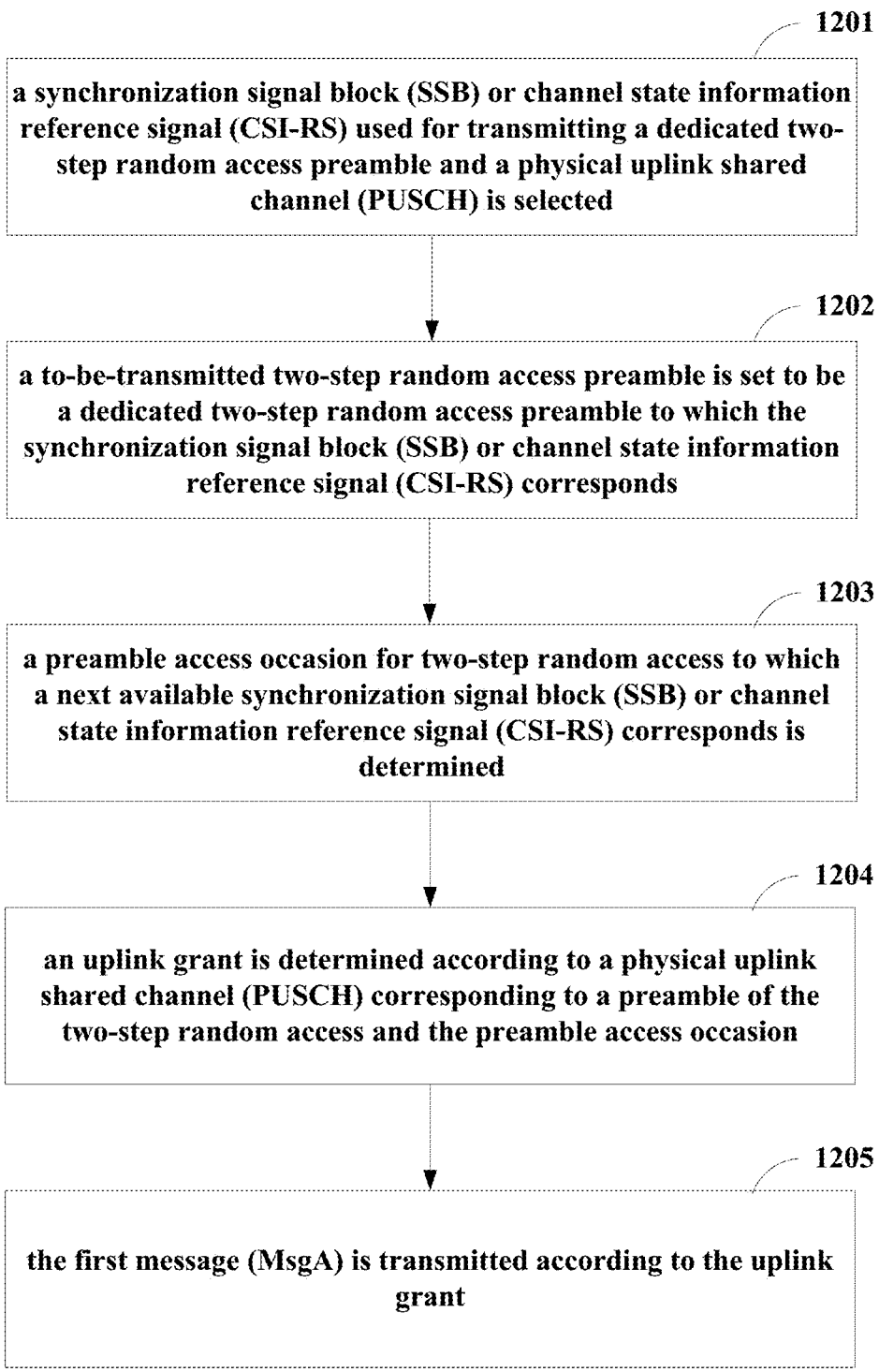
FIG. 12 is a schematic diagram of a method for executing operation 1102.

FIG. 12 is a schematic diagram of a method for executing operation 1102. As shown in FIG. 12, operation 1102 may include the following operations:

operation 1201: a synchronization signal block (SSB) or channel state information reference signal (CSI-RS) used for transmitting a dedicated two-step random access preamble and a physical uplink shared channel (PUSCH) is selected;

operation 1202: a to-be-transmitted two-step random access preamble is set to be a dedicated two-step random access preamble to which the synchronization signal block (SSB) or channel state information reference signal (CSI-RS) corresponds;

operation 1203: a preamble access occasion for two-step random access to which a next available synchronization signal block (SSB) or channel state information reference signal (CSI-RS) corresponds is determined;

operation 1204: an uplink grant is determined according to a physical uplink shared channel (PUSCH) corresponding to a preamble of the two-step random access and the preamble access occasion; and operation 1205: the first message (MsgA) is transmitted according to the uplink grant.

Operation 1201 to operation 1204 are respectively identical to operations 901-904.

In at least one embodiment, as shown in FIG. 11, the random access method may further include:

operation 1103: when the second message (MsgB) transmitted by the network device is received, it is determined that the random access response is successfully received and considered that this random access successfully completed.

In at least one embodiment, the second message (MsgB) may be a timing advance command media access control control element (TAC MAC CE) scheduled by a physical downlink control channel (PDCCH) addressed to a cell radio network temporary identifier (C-RNTI) and/or the second message (MsgB) may be a medium access control protocol data unit (MAC PDU) scheduled by a physical downlink control channel (PDCCH) addressed to a second message radio network temporary identifier (MsgB-RNTI).

In at least one embodiment, the network device may transmit the second message (MsgB) when the two-step contention-free random access preamble is successfully demodulated, or may transmit the second message (MsgB) when the two-step contention-free random access preamble and the physical uplink shared channel are successfully demodulated. For the terminal equipment, if it receives the second message (MsgB) transmitted by the network device, it may determine that the random access response of the network device is successfully received, that is, it determines that the random access response is successfully received. The terminal equipment can determine this random access successfully completed when receiving the MsgB, because the network device can recognize the terminal equipment upon receiving the contention-free preamble of MsgA and send the MsgB to the terminal equipment no matter whether the PUSCH of MsgA is correctly received by the network device.

As shown in FIG. 11, operation 1103 may include:

operation 11031: when a media access control layer protocol data unit (MAC PDU) scheduled by a physical downlink control channel (PDCCH) addressed to the cell radio network temporary identifier (C-RNTI) is successfully demodulated, and the media access control layer protocol data unit contains a timing advance command media access layer control element (TAC MAC CE), it is determined that the second message (MsgB) is received and consider this random access successfully completed.

In operation 11031, the timing advance command medium access layer control element (TAC MAC CE) contained in the medium access control layer protocol data unit is, for example, 12 bits.

In at least one embodiment, after the terminal equipment transmits the first message (MsgA), it may monitor the PDCCH addressed to the C-RNTI in a receiving window of the second message (MsgB) (msgB-ResponseWindow), and if it is determined that the medium access control layer protocol data unit (MAC PDU) scheduled by the physical downlink control channel (PDCCH) addressed to the cell radio network temporary identifier (C-RNTI) is successfully demodulated and the medium access control layer protocol data unit contains the timing advance command media access layer control unit (TAC MAC CE), it means that the second message (MsgB) transmitted by the network device is received and consider this random access successfully completed.

As shown in FIG. 11, operation 1103 may include:

operation 11032: when a media access control layer protocol data unit (MAC PDU) scheduled by a physical downlink control channel addressed to the second message radio network temporary identifier (MsgB-RNTI) is successfully demodulated, and a random access preamble identifier (RAPID) in a sub-protocol data unit (subPDU) in the media access control layer protocol data unit (MAC PDU) matches the two-step contention-free random access preamble transmitted by the terminal equipment, it is determined that the second message (MsgB) is received.

In operation 11032, the sub-protocol data unit (subPDU) includes at least a timing advance command (TAC), the timing advance command (TAC) being, for example, 12 bits.

In at least one embodiment, after the terminal equipment transmits the first message (MsgA), it may monitor the PDCCH addressed to the MsgB-RNTI in the receiving window of the second message (MsgB) (msgB-Response-Window), and if it is determined that the media access control layer protocol data unit (MAC PDU) scheduled by the physical downlink control channel addressed to the second message radio network temporary identifier (MsgB-RNTI) is successfully demodulated and the random access preamble identifier (RAPID) in a sub-protocol data unit (subPDU) in the media access control layer protocol data unit (MAC PDU) matches the two-step contention-free random access preamble transmitted by the terminal equipment, it means that the second message (MsgB) transmitted by the network device is received and consider this random access successfully completed.

In at least one embodiment, operation 1103 may include at least one of operation 11031 and operation 11032. When operation 1103 includes both operation 11031 and operation 11032, after the terminal equipment transmits the first message (MsgA), it may monitor the PDCCH addressed to the C-RNTI and monitors the PDCCH addressed to the MsgB-RNTI in the receiving window of the second message (MsgB) (msgB-ResponseWindow), and in operation 11031 and operation 11032, it determines that the random access response is successfully received and consider this random access successfully completed. For example, if the network device successfully demodulates the MsgA PUSCH, it transmits the TAC MAC CE scheduled by the PDCCH addressed to the C-RNTI to the terminal equipment, and if the MsgA PUSCH is unsuccessfully demodulated, it transmits the MAC PDU scheduled by the PDCCH addressed to the MsgB-RNTI to the terminal equipment.

In at least one embodiment, if the network device successfully demodulates the two-step contention-free random access preamble and is unable to successfully demodulate the physical uplink shared channel (PUSCH), the network device may schedule the terminal equipment to retransmit the PUSCH, such as scheduling PUSCH retransmission by using the physical downlink control channel (PDCCH) addressed to the cell radio network temporary identifier (C-RNTI), or scheduling PUSCH retransmission by using the physical downlink control channel (PDCCH) addressed to the second message radio network temporary identifier (MsgB-RNTI). In this disclosure, the above two modes for scheduling the terminal equipment to retransmit the PUSCH may be arbitrarily combined with the two modes for determining that the random access response is successfully received and consider this random access successfully completed in operations 11031 and 11032.

As shown in FIG. 11, the random access method may further include:
operation 1104: uplink grant information in the physical downlink control channel (PDCCH) addressed to the cell radio network temporary identifier (C-RNTI) is received, the uplink grant information being used to schedule a hybrid automatic repeat request (HARQ) process of the uplink shared channel to be retransmitted; and
operation 1105: HARQ process retransmission of the uplink shared channel is transmitted according to the uplink grant information.

In at least one embodiment, operation 1104 is executed after operation 11031. In operation 1104, after transmitting the first message (MsgA), the terminal equipment may monitor the PDCCH addressed to the C-RNTI in the receiving window of the second message (MsgB) (msgB-ResponseWindow), and if the uplink grant (UL grant) information in the PDCCH is received and the PDCCH schedules the HARQ process retransmission of MsgA, it means that the network does not successfully demodulate the PUSCH of MsgA. The uplink grant information includes: an uplink resource and a modulation and coding scheme (MCS) used for physical uplink shared channel (PUSCH) retransmission.

In operation 1105, the terminal equipment performs the HARQ process retransmission of the physical uplink shared channel (PUSCH) according to the uplink grant information in operation 1104.

As shown in FIG. 11, the random access method may further include:
operation 1106: when a media access control layer protocol data unit (MAC PDU) scheduled by a physical downlink control channel addressed to a second message radio network temporary identifier (MsgB-RNTI) is successfully demodulated, and an RAPID in a sub-protocol data unit (subPDU) in the media access control layer protocol data unit (MAC PDU) matches the two-step contention-free random access preamble transmitted by the terminal equipment, it is determined that the random access response is successfully received and consider this random access successfully completed, wherein the sub-protocol data unit (subPDU) at least contains uplink grant information.
operation 1107: the physical uplink shared channel is retransmitted according to the uplink grant information in the sub-protocol data unit (subPDU).

In at least one embodiment, operation 1106 is executed after operation 11031. In operation 1106, after transmitting the first message (MsgA), the terminal equipment may monitor the PDCCH addressed to the MsgB-RNTI in the receiving window of the second message (MsgB) (msgB-ResponseWindow), and if the it is determined that the media access control layer protocol data unit (MAC PDU) scheduled by the PDCCH addressed to the MsgB-RNTI is successfully demodulated, the random access preamble identifier (RAPID) in the sub-protocol data unit (subPDU) in the media access control layer protocol data unit (MAC PDU) matches the two-step contention-free random access preamble transmitted by the terminal equipment and the sub-protocol data unit (subPDU) has uplink grant (UL grant) information, it means that the network device does not successfully demodulate the MsgA PUSCH and schedules retransmission of the MsgA PUSCH via the MAC PDU. The uplink grant information includes: an uplink resource and a modulation and coding scheme (MCS) used for physical uplink shared channel (PUSCH) retransmission.

In operation 1107, the terminal equipment performs the physical uplink shared channel (PUSCH) retransmission according to the uplink grant information in operation 1106.

As shown in FIG. 11, in operation 1104, the PUSCH retransmission is scheduled by using the physical downlink control channel (PDCCH) addressed to the cell radio network temporary identity (C-RNTI); and in operation 1106, the PUSCH retransmission is scheduled by using the MAC PDU scheduled by the physical downlink control channel (PDCCH) addressed to the second message radio network temporary identity (MsgB-RNTI). Operation 1104 and operation 1106 are executed after operation 11031, that is, when the terminal equipment determines that MsgB is successfully received according to operation 11031, it may further perform PUSCH retransmission according to operation 1104 or operation 1106.

In this disclosure, the terminal equipment may further perform PUSCH retransmission when it determines according to operation 11032 that MsgB is successfully received and consider this random access successfully completed. That means the terminal equipment considers the random access is successful although the PUSCH of the first message (MsgA) is not received correctly by the network device, because the network device has recognized the terminal equipment by the dedicated preamble.

As shown in FIG. 11, the random access method may further include:

operations 1108: the sub-protocol data unit (subPDU) containing the timing advance command (TAC) in operation 11032 further contains uplink grant (UL Grant) information, and the physical uplink shared channel (PUSCH) of the first message (MsgA) is retransmitted according to the uplink grant information.

Operation 1108 is executed after operation 11032, and if the sub-protocol data unit (subPDU) in operation 11032 further contains the uplink grant (UL Grant) information, it means that the MAC PDU successfully demodulated in operation 11032 schedules retransmission of the PUSCH, and the terminal equipment performs PUSCH retransmission. The uplink grant information includes: an uplink resource and a modulation and coding scheme (MCS) used for physical uplink shared channel (PUSCH) retransmission.

As shown in FIG. 11, the random access method may further include:

operation 1109: uplink grant information in the physical downlink control channel (PDCCH) addressed to the cell radio network temporary identifier (C-RNTI) is received, the uplink grant information being used to schedule a hybrid automatic repeat request (HARQ) process of the uplink shared channel to be retransmitted; and operation 1110: the HARQ process retransmission of the physical uplink shared channel (PUSCH) is retransmitted according to the uplink grant information.

In at least one embodiment, operation 1109 is executed after operation 11032. In operation 1109, after transmitting the first message (MsgA), the terminal equipment may monitor the PDCCH addressed to the C-RNTI in the receiving window of the second message (MsgB) (msgB-ResponseWindow), and if the uplink grant (UL Grant) information in the PDCCH is received and the PDCCH schedules the HARQ process retransmission of the PUSCH, it means that the network device does not successfully demodulated the PUSCH. The uplink grant information includes: an uplink resource and a modulation and coding scheme (MCS) used for physical uplink shared channel (PUSCH) retransmission.

In operation 1110, the terminal equipment performs the HARQ process retransmission of the physical uplink shared channel (PUSCH) according to the uplink grant information in operation 1109.

It should be noted that in some other embodiments, operations 1104 and 1106 may possibly be executed before operation 11031, and operation 1109 may possibly be executed before operation 11032, that is, the terminal equipment has not yet received MsgB in receiving a retransmission scheduling indication on the MsgA PUSCH from the network device, and thus does not receive the timing advance command (TAC) transmitted by the network device, in which case the terminal does not transmit PUSCH retransmission. For example, if the second message (msgB) is not received before operation 1104 or operation 1109, the HARQ process of the physical uplink shared channel (PUSCH) is not retransmitted according to the uplink grant information in the PDCCH; and for another example, the second message (msgB) is not received before operation 1106, and the PUSCH is not retransmitted according to the uplink grant information in the MAC PDU.

In at least one embodiment, in operation 1103, if the terminal equipment not only receives the second message (MsgB) transmitted by the network device, but also receives a response of the hybrid automatic repeat request (HARQ) transmitted by the network device for the uplink shared channel, it determines that the random access is completed.

In at least one embodiment, the response of the hybrid automatic repeat request (HARQ) is a correct response of a hybrid automatic repeat request carried by the physical downlink control channel (PDCCH); or, the response of the hybrid automatic repeat request (HARQ) is new data for the hybrid automatic repeat request process scheduled by the physical downlink control channel (PDCCH).

The random access method of the embodiment of the third aspect of this disclosure shall be illustrated below by way of four examples.

Example 1

In Example 1, MsgB is a TAC MAC CE scheduled by the PDCCH addressed to the C-RNTI, and the network device schedules the PUSCH retransmission of MsgA by using the PDCCH scrambled by the C-RNTI.

Operations of the Terminal Equipment are as Follows.

After transmitting the MsgA, the terminal equipment monitors the PDCCH addressed to the C-RNTI in the receiving window of MsgB (msgB-ResponseWindow).

If the terminal equipment receives the PDCCH addressed to the C-RNTI and successfully demodulates the MAC PDU scheduled by the PDCCH and the MAC PDU contains a 12-bit TAC MAC CE, the terminal equipment determines that the random access response is received successfully. The TAC MAC CE contains an uplink time advance command (TAC) transmitted by the network device to the terminal equipment.

When the terminal equipment receives the HARQ process retransmission of MsgA scheduled by the PDCCH (that is, the PDCCH addressed to the C-RNTI includes uplink grant information), the terminal equipment retransmits the MsgA PUSCH.

In addition, if the terminal equipment receives the HARQ process retransmission of MsgA scheduled by the PDCCH scrambled with the C-RNTI when the MsgB is not received, the terminal equipment discards this retransmission indication (i.e. it does not perform the MsgA PUSCH retransmission), because the terminal equipment has not received the TAC transmitted by the network device.

The Operations of the Terminal Equipment are as Follows:

The network device transmits the MsgB as long as it successfully demodulates the MsgA preamble.

If the network device may only successfully demodulate the MsgA preamble, but is unable to successfully demodulate the MsgA PUSCH, the network device needs further to use the PDCCH scrambled by the C-RNTI to schedule the MsgA PUSCH retransmission. For example, the network device may transmit MsgB first, and then transmit the PDCCH scrambled by the C-RNTI to schedule the MsgA PUSCH retransmission.

If the network device is able to demodulate the uplink shared channel (i.e. the MsgA PUSCH), it transmits a response to the hybrid automatic repeat request (HARQ) transmitted for the uplink shared channel to the terminal equipment. The response to the hybrid automatic repeat request (HARQ) is used to indicate that the network device successfully demodulates the uplink shared channel.

Example 2

In Example 2, MsgB is a TAC MAC CE scheduled by the PDCCH addressed to the C-RNTI and is a random access response (RAR) scheduled by the PDCCH addressed to the MsgB-RNTI, and the network device schedules the MsgA PUSCH retransmission by using the random access response scheduled by the PDCCH scrambled by the MsgB-RNTI.

Operations of the Terminal Equipment are as Follows.

After transmitting the MsgA, the terminal equipment monitors the PDCCH addressed to the C-RNTI and the PDCCH scrambled by the MsgB-RNTI simultaneously in the receiving window of MsgB (msgB-ResponseWindow).

If the terminal equipment receives the PDCCH addressed to the C-RNTI and successfully demodulates the MAC PDU scheduled by the PDCCH and the MAC PDU contains a 12-bit TAC MAC CE, the terminal equipment determines that the random access response is received successfully and the random access is completed successfully. The TAC MAC CE contains an uplink time advance command (TAC) transmitted by the network device to the terminal equipment.

The terminal equipment receives the PDCCH addressed to the MsgB-RNTI, and successfully demodulates the MAC PDU scheduled by the PDCCH, and an RAPID in a subPDU in the MAC PDU matches the two-step contention-free random access preamble (i.e. the Msg A preamble) transmitted by the terminal equipment, wherein the RAR in the subPDU at least contains a 12-bit TAC and UL grant information. And the terminal equipment determines that the random access response is received successfully, and the terminal equipment retransmits the MsgA PUSCH according to the UL grant information included in the RAR in the subPDU, wherein the UL grant information is used to indicate an uplink resource and an MCS used in the MsgA PUSCH retransmission.

Operations of the Network Device are as Follows.

If the network device is able to successfully demodulate the MsgA preamble and the MsgA PUSCH, it transmits an MAC PDU (i.e. MsgB) containing the TAC MAC CE and scheduled by the PDCCH scrambled by the C-RNTI, and also transmits a response to a hybrid automatic repeat request (HARQ) transmitted for the uplink shared channel, the response to the hybrid automatic repeat request (HARQ) being used to indicate that the network device successfully demodulates the uplink shared channel.

If the network device is only able to successfully demodulate the MsgA preamble and is unable to successfully demodulate the PUSCH, it transmits a random access response, the random access response being scheduled by the PDCCH scrambled by the MsgB-RNTI, and UL grant information contained in the random access response being used by the terminal equipment to transmit MsgA PUSCH retransmission.

Example 3

In Example 3

In Example 3, MsgB is a random access response scheduled by the PDCCH scrambled by the MsgB-RNTI, and the network device schedules the MsgA PUSCH retransmission by using the PDCCH scrambled by the C-RNTI.

Operations of the Terminal Equipment are as Follows.

After transmitting the MsgA, the terminal equipment monitors the PDCCH addressed to the MsgB-RNTI in the receiving window of MsgB (msgB-ResponseWindow).

If the terminal equipment receives the PDCCH addressed to the MsgB-RNTI and successfully demodulates the MAC PDU scheduled by the PDCCH and an RAPID in a subPDU in the MAC PDU matches the contention-free two-step random access preamble (i.e. the MsgA preamble) transmitted by the terminal equipment, the terminal equipment deems that the random access response is received successfully, wherein the RAR in the subPDU at least contains a TAC of 12 bits.

When the terminal equipment receives the HARQ process retransmission of MsgA scheduled by the PDCCH scrambled by the C-RNTI, the terminal equipment retransmits the MsgA PUSCH.

If the terminal equipment receives an indication on MsgA PUSCH retransmission scheduled by the PDCCH scrambled with the C-RNTI when the MsgB is not received, the terminal equipment discards this retransmission indication, because the terminal equipment has not received the TAC transmitted by the network device.

The operations of the network device are as follows:

The network device transmits MsgB as long as it successfully demodulates the MsgA preamble.

If the network device may only successfully demodulate the MsgA preamble, but is unable to successfully demodulate the MsgA PUSCH, the network device needs further to use the PDCCH scrambled by the C-RNTI to schedule the MsgA PUSCH retransmission. Specifically, the network device may transmit MsgB first, and then schedules the MsgA PUSCH retransmission.

If the network device further successfully demodulates the MsgA PUSCH, it transmits a response to the hybrid automatic repeat request (HARQ) transmitted for the uplink shared channel. The response to the hybrid automatic repeat request (HARQ) is used to indicate that the network device successfully demodulates the uplink shared channel.

Example 4

In example 4, MsgB is a random access response scheduled by the PDCCH scrambled by the MsgB-RNTI, and the network device schedules the MsgA PUSCH retransmission by using the random access response (RAR) scheduled by the PDCCH scrambled by the MsgB-RNTI.

Operations of the Terminal Equipment are as Follows.

After transmitting the MsgA, the terminal equipment monitors the PDCCH addressed to the MsgB-RNTI in the receiving window of MsgB (msgB-ResponseWindow).

The terminal equipment receives the PDCCH addressed to the MsgB-RNTI and successfully demodulates the MAC PDU scheduled by the PDCCH and an RAPID in a subPDU in the MAC PDU matches the contention-free two-step random access preamble (i.e. the MsgA preamble) transmitted by the terminal equipment, wherein the RAR in the subPDU at least contains a TAC of 12 bits, and the terminal equipment deems that the random access response is received successfully. If the RAR in the subPDU contains UL grant information (for example, a UL grant field is a valid value), the terminal equipment retransmits the MsgA PUSCH according to the UL grant information, wherein the UL grant information is used to indicate an uplink resource and an MCS used in the retransmission of the MsgA PUSCH.

Operations of the Network Device are as Follows.

If the network device is able to successfully demodulate the MsgA preamble and the MsgA PUSCH, it transmits an MAC PDU (i.e. MsgB) containing the TAC MAC CE and scheduled by the PDCCH scrambled by the C-RNTI, and also transmits a response to a hybrid automatic repeat request (HARQ) transmitted for the uplink shared channel, the response to the hybrid automatic repeat request (HARQ) being used to indicate that the network device successfully demodulates the uplink shared channel.

If the network device is only able to successfully demodulate the preamble and is unable to successfully demodulate the PUSCH, it transmits a random access response, the random access response being scheduled by the PDCCH scrambled by the MsgB-RNTI, and the random access response containing a TAC and UL grant information, the UL grant information being used by the terminal equipment to retransmit the MsgA PUSCH.

According to the third aspect of the embodiments of this disclosure, in the two-step contention-free random access procedure, the terminal equipment is able to receive an appropriate random access response, and correctly perform such operations as PUSCH retransmission, etc.

Embodiment of a Fourth Aspect

The fourth aspect of the embodiments of this disclosure relates to a random access method, applicable to a network device, such as the network device 301. The network device 301 receives a random access request transmitted by the terminal equipment 302 and transmits a random access response to the terminal equipment 302.

The random access method of the fourth aspect of the embodiments of this disclosure relates to operations performed by a network device in a two-step contention-free random access procedure, these operations corresponding to the operations performed by the terminal equipment in the two-step contention-free random access procedure related to the random access method of the third aspect of the embodiments of this disclosure.

Figure 13:
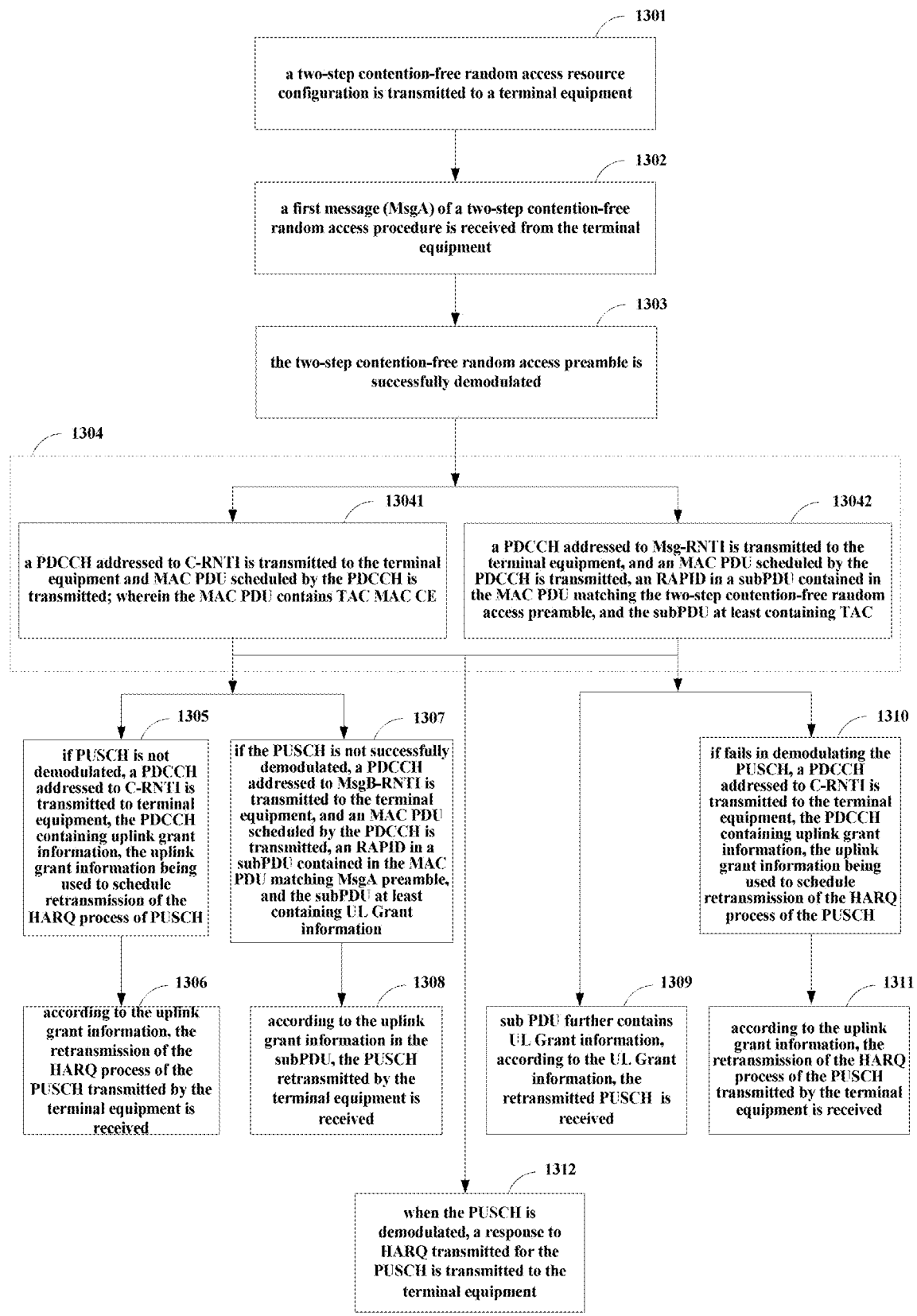
FIG. 13 is a schematic diagram of the random access method of the fourth aspect of the embodiments of this disclosure.

FIG. 13 is a schematic diagram of the random access method of the fourth aspect of the embodiments of this disclosure. As shown in FIG. 13, the random access method includes:
  operation 1301: a two-step contention-free random access resource configuration is transmitted to a terminal equipment; and
  operation 1302: a first message (MsgA) of a two-step contention-free random access procedure is received from the terminal equipment, the first message including a two-step contention-free random access preamble and a physical uplink shared channel.

In operation 1301, the network device 301 may transmit the two-step contention-free random access resource configuration to the terminal equipment 302 via a physical downlink control channel (PDCCH) or radio resource control (RRC) signaling. The two-step contention-free random access resources include dedicated two-step random access resources, the dedicated two-step random access resources including at least one synchronization signal block (SSB) or channel state information reference signal (CSI-RS) and a dedicated two-step random access preamble corresponding to the synchronization signal block (SSB) or channel state information reference signal (CSI-RS).

As shown in FIG. 13, the random access method further includes:
  operation 1303: the two-step contention-free random access preamble is successfully demodulated; and
  operation 1304: a second message (MsgB) is transmitted to the terminal equipment.

As shown in FIG. 13, operation 1304 includes:
  operation 13041: a physical downlink control channel (PDCCH) addressed to a cell radio network temporary identifier (C-RNTI) is transmitted to the terminal equipment and a media access control layer protocol data unit (MAC PDU) scheduled by the PDCCH is transmitted;
  wherein the MAC PDU contains a timing advance command media access layer control element (TAC MAC CE).

As shown in FIG. 13, operation 1304 further includes:
  operation 13042: a physical downlink control channel (PDCCH) addressed to a second message radio network temporary identifier (Msg-RNTI) is transmitted to the terminal equipment, and an MAC PDU scheduled by the PDCCH is transmitted, an RAPID in a sub-protocol data unit (subPDU) contained in the MAC PDU matching the two-step contention-free random access preamble, and the subPDU at least containing a timing advance command.

In at least one embodiment, the network device may transmit the second message (MsgB) to the terminal equipment by using at least either one of operation 13041 and operation 13042. And the network device may transmit MsgB by using both operation 13041 and operation 13042. For example, if the network device demodulates the PUSCH, it transmits MsgB by using operation 13041, and if the network device does not demodulate the PUSCH, it transmits MsgB by using operation 13042.

In at least one embodiment, the network device demodulates the two-step contention-free random access preamble, and transmits MsgB by using operation 13041. And if the network device demodulates the two-step contention-free random access preamble but fails in demodulating the physical uplink shared channel (PUSCH), retransmission of the PUSCH may be scheduled.

In at least one embodiment, the network device may schedule retransmission of the PUSCH after operation 13041.

As shown in FIG. 13, the random access method further includes:
  operation 1305: if the two-step contention-free random access preamble is demodulated, but the uplink shared channel is not demodulated, a physical downlink control channel (PDCCH) addressed to a cell radio network temporary identifier (C-RNTI) is transmitted to the terminal equipment, the PDCCH containing uplink grant information, the uplink grant information being used to schedule retransmission of the HARQ process of the uplink shared channel; and
  operation 1306: according to the uplink grant information, the retransmission of the HARQ process of the uplink shared channel transmitted by the terminal equipment is received.

In operation 1305, the PUSCH retransmission may be scheduled by using the physical downlink control channel (PDCCH) addressed to the cell radio network temporary identifier (C-RNTI). As shown in FIG. 13, operation 1305 is executed after operation 13041, that is, MsgB is transmitted first, and then retransmission of MsgA is scheduled.

As shown in FIG. 13, the random access method further includes:

operation 1307: if the two-step contention-free random access preamble is successfully demodulated, but the uplink shared channel is not successfully demodulated, a physical downlink control channel (PDCCH) addressed to a second message radio network temporary identifier (MsgB-RNTI) is transmitted to the terminal equipment, and an MAC PDU scheduled by the PDCCH is transmitted, an RAPID in a sub-protocol data unit (subPDU) contained in the MAC PDU matching the two-step contention-free random access preamble transmitted by the terminal equipment, and the sub-protocol data unit (subPDU) at least containing uplink grant information; and operation 1308: according to the uplink grant information in the subPDU, the uplink shared channel retransmitted by the terminal equipment is received.

With operation 1307, the PUSCH retransmission may be scheduled by using the MAC PDU scheduled by the physical downlink control channel (PDCCH) addressed to the second message radio network temporary identity (MsgB-RNTI).

The network device may schedule the PUSCH retransmission by using either one of operation 1305 and operation 1307.

In at least another embodiment, the network device demodulates the two-step contention-free random access preamble, transmits MsgB by using operation 13041, and if the network device demodulates the two-step contention-free random access preamble but fails in demodulating the physical uplink shared channel (PUSCH), the network device may also schedule retransmission of the PUSCH.

As shown in FIG. 13, the random access method further includes:

operation 1309: according to the uplink grant information in the subPDU, the physical uplink shared channel retransmitted by the terminal equipment is received.

For example, if the network device demodulates the two-step contention-free random access preamble but fails in demodulating the physical uplink shared channel, the subPDU containing the timing advance command (TAC) in operation 13042 may further contain uplink grant information for the terminal equipment to retransmit the uplink shared channel PUSCH, that is, it schedules the PUSCH retransmission by using the MAC PDU scheduled by the physical downlink control channel (PDCCH) addressed to the second message radio network temporary identifier (MsgB-RNTI). Hence, in operation 1309, according to the uplink grant information in the subPDU, the network device may receive the physical uplink shared channel (PUSCH) retransmitted by the terminal equipment.

As shown in FIG. 13, the random access method further includes:

operation 1310: if the network device demodulates the two-step contention-free random access preamble but fails in demodulating the uplink shared channel, a physical downlink control channel (PDCCH) addressed to a cell radio network temporary identifier (C-RNTI) is transmitted to the terminal equipment, the PDCCH containing uplink grant information, the uplink grant information being used to schedule retransmission of the HARQ process of the uplink shared channel; and operation 1311: according to the uplink grant information, the retransmission of the HARQ process of the uplink shared channel transmitted by the terminal equipment is received.

In operation 1310, the PUSCH retransmission may be scheduled by using the physical downlink control channel (PDCCH) addressed to the cell radio network temporary identity (C-RNTI). As shown in FIG. 13, operation 1310 is executed after operation 13042, that is, Msg B is transmitted first, and then the retransmission of Msg A is scheduled.

In at least one embodiment, in operation 1304, the network device transmits the second message (MsgB) to the terminal equipment if the two-step contention-free random access preamble and the uplink shared channel are successfully demodulated.

That is, there are two implementations of operation 1304, one is that as long as the Msg A preamble is successfully demodulated in operation 1303, the second message (MsgB) is transmitted to the terminal equipment; and the other is that not only the Msg A preamble needs to be successfully demodulated, but also the network device needs to successfully demodulate the MsgA PUSCH, and the second message (MsgB) is transmitted to the terminal equipment.

In some embodiments, when the uplink shared channel is demodulated, the network device may further transmit to the terminal equipment a response to the hybrid automatic repeat request (HARQ) transmitted for the uplink shared channel. For example, if in operation 1304, the second message (MsgB) is transmitted to the terminal equipment as long as the Msg A preamble is successfully demodulated in operation 1303, when the uplink shared channel is demodulated, the HARQ response transmitted for the uplink shared channel is transmitted to the terminal equipment.

As shown in FIG. 13, the random access method further includes:

operation 1312: when the uplink shared channel is demodulated, a response to a hybrid automatic repeat request (HARQ) transmitted for the uplink shared channel is transmitted to the terminal equipment; wherein the response of the hybrid automatic repeat request (HARQ) is used to indicate that the network device successfully demodulates the uplink shared channel.

In operation 1312, the response of the hybrid automatic repeat request (HARQ) is a correct response of a hybrid automatic repeat request carried by a physical downlink control channel, or the response of the hybrid automatic repeat request (HARQ) is new data of a hybrid automatic repeat request carried by a physical downlink control channel.

According to the fourth aspect of the embodiments of this disclosure, in the two-step contention-free random access process, the network device may transmit an appropriate random access response.

Embodiment of a Fifth Aspect

The fifth aspect of the embodiments of this disclosure provides a random access apparatus, applicable to a terminal equipment, such as the terminal equipment 302.

Figure 14:
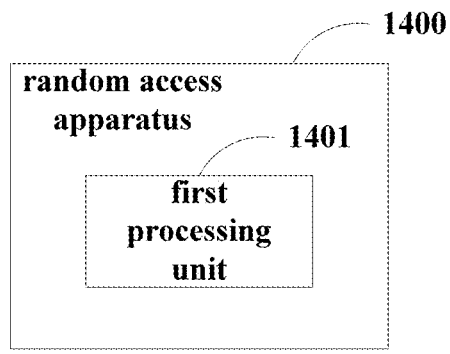
FIG. 14 is a schematic diagram of the random access apparatus of the fifth aspect of the embodiments of this disclosure.

FIG. 14 is a schematic diagram of the random access apparatus of the fifth aspect of the embodiments of this disclosure. As shown in FIG. 14, a random access apparatus 1400 includes a first processing unit 1401.

The first processing unit 1401 may execute the random access method of the first aspect of the embodiments of this disclosure. Reference may be made to the description of the random access method of the first aspect of the embodiments of this disclosure for executing the random access method by the first processing unit 1401.

Figure 15:
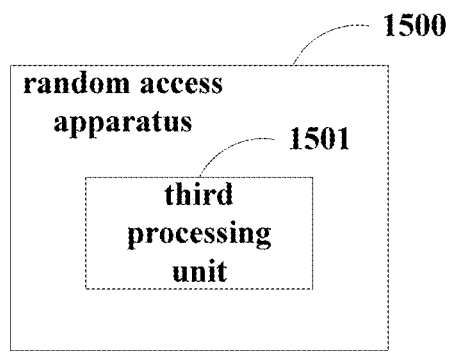
FIG. 15 is another schematic diagram of the random access apparatus of the fifth aspect of the embodiments of this disclosure.

FIG. 15 is another schematic diagram of the random access apparatus of the fifth aspect of the embodiments of this disclosure. As shown in FIG. 15, a random access apparatus 1500 includes a third processing unit 1501.

The third processing unit 1501 may execute the random access method of the third aspect of the embodiments of this disclosure. Reference may be made to the description of the random access method of the third aspect of the embodiments of this disclosure for executing the random access method by the third processing unit 1501.

Embodiment of a Sixth Aspect

The sixth aspect of the embodiments of this disclosure provides a random access apparatus, applicable to a network device, such as the network device 301.

Figure 16:
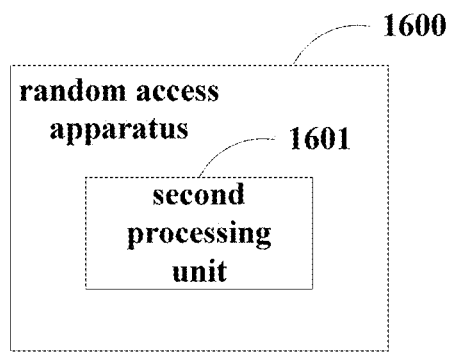
FIG. 16 is a schematic diagram of the random access apparatus of the sixth aspect of the embodiments of this disclosure.

FIG. 16 is a schematic diagram of the random access apparatus of the sixth aspect of the embodiments of this disclosure. As shown in FIG. 16, a random access apparatus 1600 includes a second processing unit 1601.

The second processing unit 1601 may execute the random access method of the second aspect of the embodiments of this disclosure. Reference may be made to the description of the random access method of the second aspect of the embodiments of this disclosure for executing the random access method by the second processing unit 1601.

Figure 17:
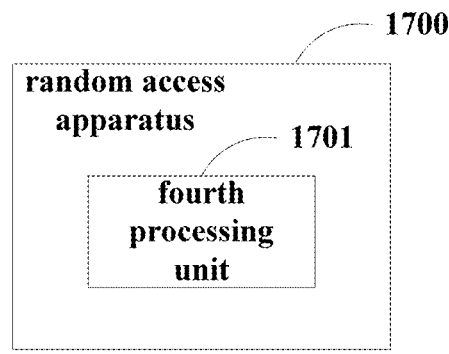
FIG. 17 is another schematic diagram of the random access apparatus of the sixth aspect of the embodiments of this disclosure.

FIG. 17 is another schematic diagram of the random access apparatus of the sixth aspect of the embodiments of this disclosure. As shown in FIG. 17, a random access apparatus 1700 includes a fourth processing unit 1701.

The fourth processing unit 1701 may execute the random access method of the fourth aspect of the embodiments of this disclosure. Reference may be made to the description of the random access method of the fourth aspect of the embodiments of this disclosure for executing the random access method by the fourth processing unit 1701.

Embodiment of a Seventh Aspect

Embodiment of the seventh aspect of this disclosure provides a terminal equipment, including the random access apparatus 1400 or 1500 as described in the embodiment of the third aspect.

Figure 18:
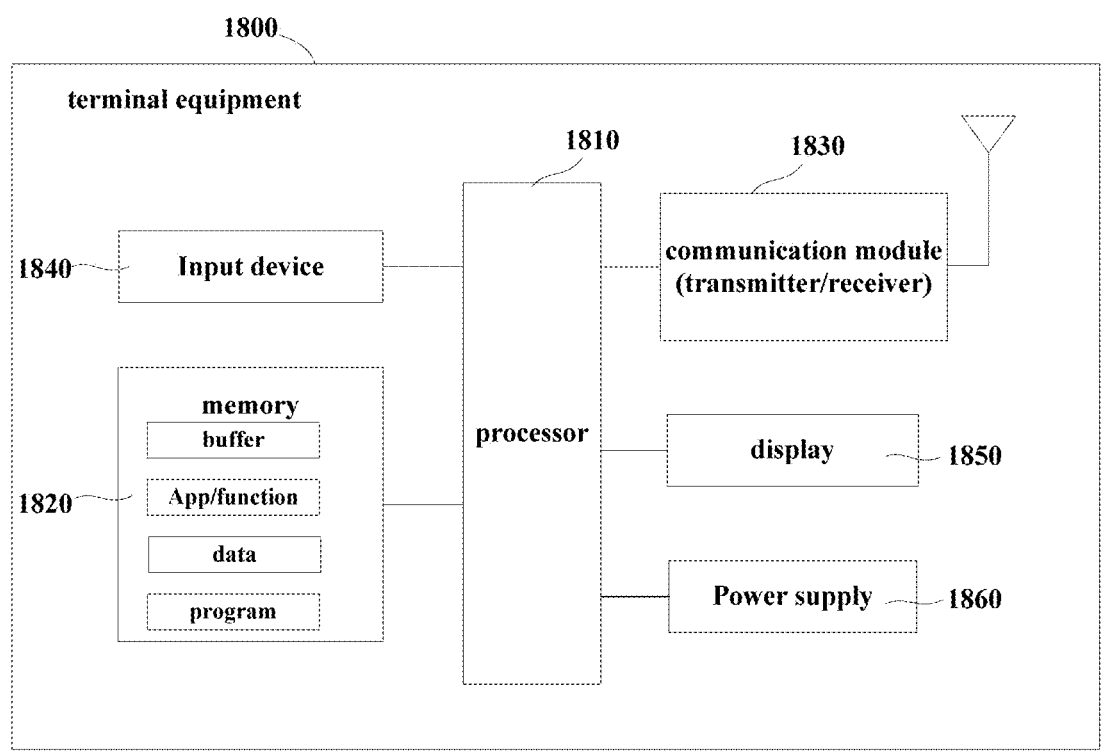
FIG. 18 is a schematic diagram of a systematic structure of the terminal equipment 1800 of the seventh aspect of the embodiments of this disclosure.

FIG. 18 is a schematic diagram of a systematic structure of the terminal equipment of the embodiment of the seventh aspect of this disclosure. As shown in FIG. 18, a terminal equipment 1800 may include a processor 1810 and a memory 1820, the memory 1820 being coupled to the processor 1810. It should be noted that this figure is illustrative only, and other types of structures may also be used, so as to supplement or replace this structure and achieve a telecommunications function or other functions.

In one implementation, the functions of the random access apparatus 1400 or 1500 may be integrated into the processor 1810; wherein the processor 1810 may be configured to carry out the random access method described in the embodiment of the first aspect.

In another implementation, the random access apparatus 1400 or 1500 and the processor 1810 may be configured separately; for example, the random access apparatus 1400 or 1500 may be configured as a chip connected to the processor 1810, and the functions of the random access apparatus 1400 or 1500 are executed under control of the processor 1810.

As shown in FIG. 18, the terminal equipment 1800 may further include a communication module 1830, an input unit 1840, a display 1850, and a power supply 1860. It should be noted that the terminal equipment 1800 does not necessarily include all the parts shown in FIG. 18, and the above components are not necessary. Furthermore, the terminal equipment 1800 may include parts not shown in FIG. 18, and the related art may be referred to.

As shown in FIG. 18, the processor 1810 is sometimes referred to as a controller or an operational control, which may include a microprocessor or other processor devices and/or logic devices. The processor 1810 receives input and controls operations of components of the terminal equipment 1800.

The memory 1820 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1810 may execute programs stored in the memory 1820, so as to realize information storage or processing, etc. Functions of other parts are similar to those of the related art, which shall not be described herein any further. The parts of the terminal equipment 1800 may be realized by specific hardware, firmware, software, or any combination thereof, without departing from the scope of this disclosure.

Embodiment of an Eighth Aspect

Embodiment of the eighth aspect of this disclosure provides a network device, including the random access apparatus 1600 or 1700 as described in the embodiment of the fourth aspect.

Figure 19:
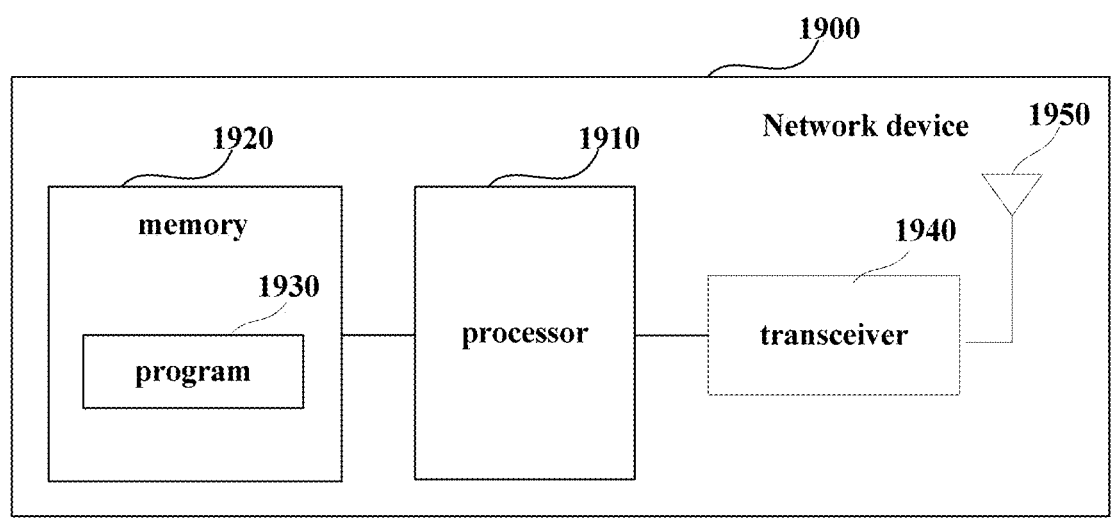
FIG. 19 is a schematic diagram of a structure of the network device of an embodiment of this disclosure.

FIG. 19 is a schematic diagram of a structure of the network device of the embodiment of this disclosure. As shown in FIG. 19, a network device 1900 may include a processor 1910 and a memory 1920, the memory 1920 being coupled to the processor 1910. The memory 1920 may store various data, and furthermore, it may store a program 1930 for data processing, and execute the program 1930 under control of the processor 1910, so as to receive various information transmitted by a user equipment, and transmit various information to the user equipment.

In one implementation, the functions of the random access apparatus 1600 or 1700 may be integrated into the processor 1910. The processor 1910 may be configured to carry out the random access method described in the embodiment of the second aspect of this disclosure.

In another implementation, the random access apparatus 1600 or 1700 and the processor 1910 may be configured separately; for example, the random access apparatus 1600 or 1700 may be configured as a chip connected to the processor 1910, and the functions of the random access apparatus 1600 or 1700 are executed under control of the processor 1910.

Furthermore, as shown in FIG. 19, the network device 1900 may include a transceiver 1940, and an antenna 1950, etc. Functions of the above components are similar to those in the related art, and shall not be described herein any further. It should be noted that the network device 1900 does not necessarily include all the parts shown in FIG. 19. Furthermore, the network device 1900 may include parts not shown in FIG. 19, and the related art may be referred to.

Embodiment of a Ninth Aspect

The embodiment of the ninth aspect of this disclosure provides a communication system, including the network device described in the embodiment of the eighth aspect and the terminal equipment described in the embodiment of the seventh aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules.

Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to implementations including the above embodiments, following supplements are further disclosed.

1. A random access method, applicable to a terminal equipment, the method including:
    determining a random access type according to configuration information of a bandwidth part (BWP) for random access selected by the terminal equipment and downlink reference signal received power measured by the terminal equipment;
    performing selection of random access resources; and
    transmitting an initial message of random access on the random access resources.

2. The method according to supplement 1, wherein the determining a random access type according to configuration information of a bandwidth part selected by the terminal equipment and downlink reference signal received power measured by the terminal equipment includes:
    in a case where the bandwidth part selected by the terminal equipment is configured with two-step random access resources and the downlink reference signal received power measured by the terminal equipment is higher than a first threshold, determining that the random access type is two-step random access, or in a case where the bandwidth part selected by the terminal equipment is only configured with two-step random access resources, determining that the random access type is two-step random access; otherwise, determining that the random access type is four-step random access.

3. The method according to supplement 2, wherein,
    when the terminal equipment selects a supplementary uplink (SUL) carrier to perform random access, the first threshold is a first threshold of the supplementary uplink,
    and when the terminal equipment selects a normal uplink (NUL) carrier to perform random access, the first threshold is a first threshold of the normal uplink.

4. The method according to supplement 2, wherein,
    the first threshold is a measurement threshold parameter based on a synchronization signal block (SSB) configured by radio resource control (RRC) signaling.

5. The method according to supplement 2, wherein,
    the two-step random access resources include a synchronization signal block (SSB) used for two-step random access, a two-step random access preamble, a preamble access occasion for two-step random access, and a physical uplink shared channel (PUSCH) resource for two-step random access.

6. The method according to supplement 2, wherein the step of performing random access resource selection includes:
    performing two-step random access resource selection after determining that the random access type is two-step random access; and
    performing four-step random access resource selection after determining that the random access type is four-step random access.

7. The method according to supplement 6, wherein the step of performing two-step random access resource selection includes:
    selecting two-step contention-free random access resources if a selection condition of the two-step contention-free random access resources is satisfied; and
    selecting two-step contention-based random access resources if the selection condition of the two-step contention-free based random access resources is not satisfied.

8. The method according to supplement 6, wherein the step of performing two-step random access resource selection includes:
   selecting two-step contention-free random access resources if a selection condition of the two-step contention-free random access resources is satisfied;
   selecting contention-free random access resources if the selection condition of the two-step contention-free random access resources is not satisfied but a selection condition of contention-free random access resources is satisfied; and
   selecting two-step contention-based random access resources if the selection condition of the two-step contention-free random access resources is not satisfied and the selection condition of contention-free random access resources is not satisfied.

9. The method according to supplement 6, wherein the step of performing four-step random access resource selection includes:
   selecting contention-free random access resources if a selection condition of the contention-free random access resources is satisfied; and
   selecting four-step contention-based random access resources if the selection condition of the contention-free based random access resources is not satisfied.

10. The method according to supplement 6, wherein the step of performing four-step random access resource selection includes:
   selecting two-step contention-free random access resources if a selection condition of the two-step contention-free random access resources is satisfied;
   selecting contention-free random access resources if the selection condition of the two-step contention-free random access resources is not satisfied but a selection condition of contention-free random access resources is satisfied; and
   selecting four-step contention-based random access resources if the selection condition of the two-step contention-free random access resources is not satisfied and the selection condition of contention-free random access resources is not satisfied.

11. The method according to supplement 7, 8 or 10, wherein the satisfying the selection condition of the two-step contention-free random access resources includes:
   that the terminal equipment is configured with dedicated two-step random access resources by a network device, and reference signal received power (RSRP) of at least one synchronization signal block (SSB) or channel state information reference signal (CSI-RS) in the dedicated two-step random access resources is higher than a second threshold;
   wherein the dedicated two-step random access resources include at least one synchronization signal block (SSB) or channel state information reference signal (CSI-RS) and a dedicated two-step random access preamble to which the synchronization signal block (SSB) or channel state information reference signal (CSI-RS) corresponds.

12. The method according to supplement 7, 8 or 10, wherein the step of selecting two-step contention-free random access resources includes:
   selecting a synchronization signal block (SSB) or channel state information reference signal (CSI-RS) used for transmitting a dedicated two-step random access preamble and a physical uplink shared channel (PUSCH);
   setting a to-be-transmitted two-step random access preamble to be a dedicated two-step random access preamble to which the synchronization signal block (SSB) or channel state information reference signal (CSI-RS) corresponds;
   determining a preamble access occasion for two-step random access to which a next available synchronization signal block (SSB) or channel state information reference signal (CSI-RS) corresponds; and
   determining an uplink grant according to a physical uplink shared channel (PUSCH) corresponding to a preamble of the two-step random access and the preamble access occasion.

13. The method according to supplement 12, wherein the setting a to-be-transmitted two-step random access preamble to be a dedicated two-step random access preamble to which the synchronization signal block (SSB) or channel state information reference signal (CSI-RS) corresponds includes:
   if the synchronization signal block (SSB) or channel state information reference signal (CSI-RS) is configured with a dedicated two-step random access preamble corresponding to group A and group B, selecting a dedicated two-step random access preamble of group A or group B according to a path loss and/or a transport block size (TB size) of a first message (MsgA) of a two-step contention-free random access procedure;
   wherein modulation and coding schemes (MCSs) of the physical uplink shared channels (PUSCHs) to which the dedicated two-step random access preambles of group A and group B correspond are different.

14. The method according to supplement 13, wherein the step of selecting a dedicated two-step random access preamble of group A or group B according to a path loss and/or a transport block size (TB size) of MsgA includes:
   if the path loss is less than a loss threshold, and/or the transport block size (TB size) of the first message (MsgA) is greater than a transport block size threshold, setting the to-be-transmitted two-step random access preamble to be the dedicated two-step random access preamble of group B;
   otherwise, setting the to-be-transmitted two-step random access preamble to be the dedicated two-step random access preamble of group A.

15. The method according to any one of supplements 1-14, wherein after the step of transmitting an initial message of random access on the random access resource, the method further includes:
   if the random access procedure is not completed, performing selection of random access resources again.

16. The method according to supplement 15, wherein, if the terminal equipment selects the two-step random access resources, or if the random access type is two-step random access,
   selection of random access resources is performed again in the case that the random access procedure is not successfully completed.

17. The method according to supplement 16, wherein, if the random access procedure is not successfully completed and a count value of transmitting random access preambles is greater than a threshold N, the random access type is set to be four-step random access, and selection of four-step random access resources is performed.

18. The method according to supplement 15, wherein, if the terminal selects four-step random access resources, or if the random access type is four-step random access, selection of four-step random access resources is performed again in the case that the random access is not completed successfully.

19. The method according to supplement 16 or 18, wherein,
the step of performing selection of random access resources again includes:
if it is determined that there exist two-step contention-free random access resources satisfying the selection condition within a backoff time, or that there exist contention-free random access resources satisfying the selection condition, selection of random access resources is performed again before the end of the backoff time; otherwise, after the end of the backoff time, selection of random access resources is performed again.

20. The method according to supplement 15, wherein if the two-step contention-free random access resources are selected, the random access being not completed includes:
receiving no second message (MsgB) after the first message (MsgA) of two-step contention-free random access is transmitted and before the end of a two-step random access response receiving window (ra-ResponseWindowtwo-step).

21. A random access method, applicable to a network device, the method including:
transmitting configuration information of random access of one or more bandwidth parts to a terminal equipment; wherein the configuration information includes two-step random access resources;
the two-step random access resources including: a synchronization signal block (SSB) used for two-step random access, a two-step random access preamble, a preamble access occasion for two-step random access, and a physical uplink shared channel (PUSCH) resource of two-step random access.

22. The method according to claim 21, wherein the method further includes:
transmitting a first threshold to the terminal equipment, the first threshold being used by the terminal equipment for determining a random access type.

23. The method according to claim 22, wherein the first threshold includes a first threshold of a supplementary uplink (SUL), or a first threshold of a normal uplink.

24. The method according to claim 21, wherein the method further includes:
configuring dedicated two-step random access resources for the terminal equipment;
wherein the dedicated two-step random access resources include at least one synchronization signal block (SSB) or channel state information reference signal (CSI-RS) and a dedicated two-step random access preamble to which the synchronization signal block (SSB) or channel state information reference signal (CSI-RS) corresponds.

25. The method according to supplement 24, wherein the method further includes:
transmitting a second threshold to the terminal equipment, the second threshold being used by the terminal equipment for selecting a synchronization signal block (SSB) or a channel state information reference signal (CSI-RS).

26. The method according to supplement 24, wherein,
the synchronization signal block (SSB) or channel state information reference signal (CSI-RS) is configured with a dedicated two-step random access preamble corresponding to group A and group B;
wherein modulation and coding schemes (MCSs) of physical uplink shared channels (PUSCHs) to which the dedicated two-step random access preambles of group A and group B correspond are different.

27. A random access method, applicable to a terminal equipment, the method including:
receiving two-step contention-free random access resource configuration transmitted by a network device for a first message (MsgA); and
transmitting to the network device the first message (MsgA) of a two-step contention-free random access procedure, the first message including a two-step contention-free random access preamble and a physical uplink shared channel.

27a. The apparatus according to supplement 27, wherein the method further includes:
starting a response window for a second message (MsgB); and,
monitoring a physical downlink control channel (PDCCH) addressed to a cell radio network temporary identifier (C-RNTI) and a PDCCH addressed to a second message radio network temporary identifier (MsgB-RNTI) while the response window for MsgB is running.

28. The method according to supplement 27, wherein,
the terminal equipment receives the two-step contention-free random access resource configuration via a physical downlink control channel (PDCCH) or radio resource control (RRC) signaling.

29. The method according to supplement 27, wherein,
the two-step contention-free random access resources include dedicated two-step random access resources,
the dedicated two-step random access resources including at least one synchronization signal block (SSB) or channel state information reference signal (CSI-RS) and a dedicated two-step random access preamble to which the synchronization signal block (SSB) or channel state information reference signal (CSI-RS) corresponds.

30. The method according to supplement 27a, wherein the transmitting to the network device a first message (MsgA) of a two-step contention-free random access procedure includes:
selecting a synchronization signal block (SSB) or channel state information reference signal (CSI-RS) used for transmitting a dedicated two-step random access preamble and a physical uplink shared channel (PUSCH);
setting a to-be-transmitted two-step random access preamble to be a dedicated two-step random access preamble to which the synchronization signal block (SSB) or channel state information reference signal (CSI-RS) corresponds;
determining a preamble access occasion for two-step random access to which a next available synchronization signal block (SSB) or channel state information reference signal (CSI-RS) corresponds;
determining an uplink grant according to a physical uplink shared channel (PUSCH) corresponding to a preamble of the two-step random access and the preamble access occasion; and
transmitting the first message (MsgA) according to the uplink grant.

31. The method according to supplement 27a, wherein the method further includes:
when receiving the second message (MsgB) transmitted by the network device, determining that the random access response is successfully received and considering this random access successfully completed.

32. The method according to supplement 31, wherein the receiving the second message (MsgB) transmitted by the network device includes:
   a media access control layer protocol data unit (MAC PDU) scheduled by a physical downlink control channel (PDCCH) addressed to the cell radio network temporary identifier (C-RNTI) is successfully demodulated, and the media access control layer protocol data unit contains a timing advance command media access layer control element (TAC MAC CE).

33. The method according to supplement 32, wherein the method further includes:
   receiving uplink grant information in the physical downlink control channel (PDCCH) addressed to a cell radio network temporary identifier (C-RNTI), the uplink grant information being used to schedule a hybrid automatic repeat request (HARD) process of the uplink shared channel to be retransmitted; and
   performing HARQ retransmission of the uplink shared channel according to the uplink grant information.

34. The method according to supplement 32, wherein the method further includes:
   determining that a media access control layer protocol data unit (MAC PDU) scheduled by a physical downlink control channel addressed to a second message radio network temporary identifier (MsgB-RNTI) is successfully demodulated, and that an RAPID in a sub-protocol data unit (subPDU) in the media access control layer protocol data unit (MAC PDU) matches the two-step contention-free random access preamble transmitted by the terminal equipment; wherein the sub-protocol data unit (subPDU) at least contains uplink grant information.

35. The method according to supplement 34, wherein the method further includes:
   retransmitting the physical uplink shared channel according to the uplink grant information in the sub-protocol data unit (subPDU).

36. The method according to supplement 31, wherein the receiving the second message (MsgB) transmitted by the network device, includes:
   a media access control layer protocol data unit (MAC PDU) scheduled by a physical downlink control channel addressed to the second message radio network temporary identifier (MsgB-RNTI) is successfully demodulated, and a random access preamble identifier (RAPID) in a sub-protocol data unit (subPDU) in the media access control layer protocol data unit (MAC PDU) matches the two-step contention-free random access preamble transmitted by the terminal equipment;
   wherein the sub-protocol data unit (subPDU) at least contains a timing advance command (TAC).

37. The method according to supplement 36, wherein, the subPDU further contains uplink grant information, and the method further includes: retransmitting the uplink shared channel of the first message (MsgA) according to the uplink grant information.

38. The method according to supplement 36, wherein the method further includes:
   receiving uplink grant information in the physical downlink control channel (PDCCH) addressed to the cell radio network temporary identifier (C-RNTI), the uplink grant information being used to schedule a hybrid automatic repeat request (HARQ) process of the uplink shared channel to be retransmitted; and
   retransmitting the physical uplink shared channel (PUSCH) according to the uplink grant information.

39. The method according to supplements 33, 35 and 38, wherein the method further includes:
   if the second message (msgB) is not received when the uplink grant information used for scheduling the retransmission of the physical uplink shared channel (PUSCH) is received, not retransmitting the physical uplink shared channel (PUSCH) according to the uplink grant information.

40. The method according to supplement 31, wherein the second message (MsgB) transmitted by the network device and a response to the hybrid automatic repeat request (HARQ) transmitted by the physical uplink shared channel are received, and completion of random access is determined;
   wherein the response to the hybrid automatic repeat request (HARQ) is used to indicate that the network device successfully demodulates the physical uplink shared channel.

41. The method according to supplement 40, wherein,
   the response to the hybrid automatic repeat request (HARQ) is a correct response to a hybrid automatic repeat request carried by a physical downlink control channel; or
   the response to the hybrid automatic repeat request (HARQ) is new data of a hybrid automatic repeat request process scheduled by the physical downlink control channel.

42. A random access method, applicable to a network device, the method including:
   transmitting a two-step contention-free random access resource configuration to the terminal equipment; and
   receiving a first message (MsgA) of a two-step contention-free random access procedure from the terminal equipment, the first message including a two-step contention-free random access preamble and a physical uplink shared channel.

43. The method according to supplement 42, wherein,
   the two-step contention-free random access resource configuration is transmitted to the terminal equipment via a physical downlink control channel (PDCCH) or radio resource control (RRC) signaling.

44. The method according to supplement 42, wherein,
   the two-step contention-free random access resources include a dedicated two-step random access resource, the dedicated two-step random access resource including at least one synchronization signal block (SSB) or channel state information reference signal (CSI-RS) and a dedicated two-step random access preamble to which the synchronization signal block (SSB) or channel state information reference signal (CSI-RS) corresponds.

45. The method according to supplement 42, wherein the method further includes:
   successfully demodulating the two-step contention-free random access preamble; and
   transmitting a second message (MsgB) to the terminal equipment.

46. The method according to supplement 45, wherein the transmitting a second message (MsgB) to the terminal equipment includes:
   transmitting to the terminal equipment a physical downlink control channel (PDCCH) addressed to a cell radio network temporary identifier (C-RNTI) and transmitting a media access control layer protocol data unit (MAC PDU) scheduled by the PDCCH;
wherein the MACPDU contains a timing advance command media access layer control element (TAC MAC CE).

47. The method according to supplement 46, wherein the method further includes:
if the two-step contention-free random access preamble is demodulated, but the uplink shared channel is not demodulated,
transmitting a physical downlink control channel (PDCCH) addressed to a cell radio network temporary identifier (C-RNTI) to the terminal equipment, the PDCCH containing uplink grant information, the uplink grant information being used to schedule retransmission of the HARQ process of the uplink shared channel; and
receiving, according to the uplink grant information, the retransmission of the HARQ process of the uplink shared channel transmitted by the terminal equipment.

48. The method according to supplement 47, wherein,
the second message (MsgB) is transmitted before transmitting the physical downlink control channel (PDCCH) addressed to the cell radio network temporary identifier (C-RNTI) to the terminal equipment;
wherein the PDCCH contains uplink scheduling information used for scheduling the retransmission of the HARQ process of the uplink shared channel.

49. The method according to supplement 46, wherein the step of transmitting a second message (MsgB) to the terminal equipment further includes:
if the two-step contention-free random access preamble is successfully demodulated, but the uplink shared channel is not demodulated,
transmitting a physical downlink control channel (PDCCH) addressed to a second message radio network temporary identifier (Msg-RNTI) to the terminal equipment, and transmitting an MAC PDU scheduled by the PDCCH,
an RAPID in a sub-protocol data unit (subPDU) contained in the MAC PDU matching the two-step contention-free random access preamble, and the subPDU at least containing uplink grant information.

50. The method according to supplement 49, wherein,
the uplink grant information contained in the subPDU is used by the terminal equipment to retransmit the uplink shared channel,
and the method further includes:
receiving, according to the uplink grant information in the subPDU, the uplink shared channel retransmitted by the terminal equipment.

51. The method according to supplement 45, wherein the step of transmitting a second message (MsgB) to the terminal equipment further includes:
transmitting a physical downlink control channel (PDCCH) addressed to a second message radio network temporary identifier (msgB-RNTI) to the terminal equipment, and transmitting an MAC PDU scheduled by the PDCCH,
an RAPID in a sub-protocol data unit (subPDU) contained in the MAC PDU matching the two-step contention-free random access preamble, and the subPDU at least containing a timing advance command (TAC).

52. The method according to supplement 51, wherein,
the subPDU further includes uplink grant information, the uplink grant information being used by the terminal equipment to retransmit the uplink shared channel,
and the method further includes:
receiving, according to the uplink grant information, the uplink shared channel retransmitted by the terminal equipment.

53. The method according to supplement 51, wherein the method further includes:
transmitting a physical downlink control channel (PDCCH) addressed to a cell radio network temporary identifier (C-RNTI) to the terminal equipment, the PDCCH containing uplink grant information, the uplink grant information being used to schedule retransmission of an HARQ process of the uplink shared channel; and
receiving, according to the uplink grant information, the HARQ process retransmission of the uplink shared channel transmitted by the terminal equipment.

54. The method according to supplement 53, wherein,
the second message (MsgB) is transmitted before transmitting the physical downlink control channel (PDCCH) addressed to the cell radio network temporary identifier (C-RNTI) to the terminal equipment;
wherein the PDCCH contains uplink scheduling information used for scheduling the retransmission of the HARQ process of the uplink shared channel.

55. The method according to supplement 45, wherein the method further includes:
when the uplink shared channel is demodulated,
transmitting to the terminal equipment a response to a hybrid automatic repeat request (HARQ) transmitted by the uplink shared channel;
wherein the response of the hybrid automatic repeat request (HARQ) is used to indicate that the network device successfully demodulates the uplink shared channel.

56. The method according to supplement 55, wherein,
the response to the hybrid automatic repeat request (HARQ) is a correct response to a hybrid automatic repeat request carried by a physical downlink control channel; or
the response to the hybrid automatic repeat request (HARQ) is new data of a hybrid automatic repeat request process scheduled by the physical downlink control channel.

57. The method according to supplement 42, wherein the method further includes:
transmitting the second message (MsgB) to the terminal equipment when the two-step contention-free random access preamble is successfully demodulated and the uplink shared channel is successfully demodulated.

What is claimed is:
1. A random access apparatus, applicable to a terminal equipment, the apparatus comprising first processor circuitry, wherein the first processor circuitry is configured to:
determine a random access type according to configuration information of a bandwidth part (BWP) for random access selected by the terminal equipment and downlink reference signal received power measured by the terminal equipment;
perform selection of random access resources; and
transmit an initial message of random access on the random access resources,
wherein the performing of the selection of the random access resources comprises:
performing two-step random access resource selection after determining that the random access type is two-step random access; and performing four-step random access resource selection after determining that the random access type is four-step random access, wherein the performing two-step random access resource selection comprises:

selecting two-step contention-free random access resources when a selection condition of the two-step contention-free random access resources is satisfied; and selecting two-step contention-based random access resources when the selection condition of the two-step contention-free based random access resources in not satisfied.

2. The apparatus according to claim 1, wherein the determining a random access type according to configuration information of a bandwidth part selected by the terminal equipment and downlink reference signal received power measured by the terminal equipment comprises:

in a case where the bandwidth part selected by the terminal equipment is configured with two-step random access resources and the downlink reference signal received power measured by the terminal equipment is higher than a first threshold, determining that the random access type is two-step random access, or in a case where the bandwidth part selected by the terminal equipment is only configured with two-step random access resources, determining that the random access type is two-step random access; otherwise, determining that the random access type is four-step random access.

3. The apparatus according to claim 1, wherein the selection condition of the two-step contention-free based random access resources being satisfied comprises:

that the terminal equipment is configured with dedicated two-step random access resources by a network device, and reference signal received power (RSRP) of at least one synchronization signal block (SSB) or channel state information reference signal (CSI-RS) in the dedicated two-step random access resources is higher than a second threshold;

wherein the dedicated two-step random access resources comprise at least one synchronization signal block (SSB) or channel state information reference signal (CSI-RS) and a dedicated two-step random access preamble to which the synchronization signal block (SSB) or channel state information reference signal (CSI-RS) corresponds.

4. The apparatus according to claim 1, wherein the selecting two-step contention-free random access resources comprises:

selecting a synchronization signal block (SSB) or channel state information reference signal (CSI-RS) used for transmitting a dedicated two-step random access preamble and a physical uplink shared channel (PUSCH);

setting a to-be-transmitted two-step random access preamble to be a dedicated two-step random access preamble to which the synchronization signal block (SSB) or the channel state information reference signal (CSI-RS) corresponds;

determining a preamble access occasion for two-step random access to which a next available synchronization signal block (SSB) or channel state information reference signal (CSI-RS) corresponds; and determining an uplink grant according to a physical uplink shared channel (PUSCH) corresponding to the to-be-transmitted two-step random access preamble and the preamble access occasion.

5. The apparatus according to claim 4, wherein the setting a to-be-transmitted two-step random access preamble to be a dedicated two-step random access preamble to which the synchronization signal block (SSB) or the channel state information reference signal (CSI-RS) corresponds comprises:

when the synchronization signal block (SSB) or the channel state information reference signal (CSI-RS) is configured with dedicated two-step random access preambles corresponding to group A and group B, selecting a dedicated two-step random access preamble of group A or group B according to a path loss and/or a transport block size (TB size) of a first message (MsgA) of a two-step contention-free random access procedure;

wherein modulation and coding schemes (MCSs) of the physical uplink shared channels (PUSCHs) to which the dedicated two-step random access preambles corresponding to group A and group B correspond are different.

6. The apparatus according to claim 1, wherein, when the terminal equipment selects the two-step random access resources, or when the random access type is two-step random access, selection of random access resources is performed again in the case that a random access procedure is not successfully completed.

7. The apparatus according to claim 6, wherein, when the random access procedure is not successfully completed and a count value of transmitting random access preambles is greater than a threshold N, the random access type is set to four-step random access, and selection of four-step random access resources is performed.

8. The apparatus according to claim 6, wherein, the selection of random access resources being performed again comprises:

when it is determined that there exist two-step contention-free random access resources satisfying the selection condition within backoff time, or that there exist contention-free random access resources satisfying the selection condition, selection of random access resources is performed again before the end of the backoff time; otherwise, after the end of the backoff time, selection of random access resources is performed again.

9. A random access apparatus, applicable to a terminal equipment, the apparatus comprising third processor circuitry, wherein the third processor circuitry is configured to:

receive two-step contention-free random access resource configuration transmitted by a network device for a first message (MsgA);

transmit to the network device the first message (MsgA) of a two-step contention-free random access procedure, the first message comprising a two-step contention-free random access preamble and a physical uplink shared channel; and when receiving a second message (MsgB) transmitted by the network device, determine that the random access response is successfully received and consider this random access successfully completed, wherein the receiving the second message (MsgB) transmitted by the network device comprises:

a media access control layer protocol data unit (MAC PDU) scheduled by a physical downlink control channel (PDCCH) addressed to the cell radio network temporary identifier (C-RNTI) is successfully demodulated, and the media access control layer protocol data unit contains a timing advance command media access layer control element (TAC MAC CE).

10. The apparatus according to claim 9, wherein,
the third processor circuitry receives the two-step contention-free random access resource configuration via a physical downlink control channel (PDCCH) or radio resource control (RRC) signaling.

11. The apparatus according to claim 9, wherein,
the two-step contention-free random access resources comprise dedicated two-step random access resources, and
the dedicated two-step random access resources comprising at least one synchronization signal block (SSB) or channel state information reference signal (CSI-RS) and a dedicated two-step random access preamble to which the synchronization signal block (SSB) or the channel state information reference signal (CSI-RS) corresponds.

12. The apparatus according to claim 9, wherein the third processor circuitry is further configured to:
start a response window for a second message (MsgB); and
monitor a physical downlink control channel (PDCCH) addressed to a cell radio network temporary identifier (C-RNTI) and a PDCCH addressed to a second message radio network temporary identifier (MsgB-RNTI) while the response window for MsgB is running.

13. The apparatus according to claim 9, wherein the third processor circuitry is further configured to:
receive uplink grant information in the physical downlink control channel (PDCCH) addressed to a cell radio network temporary identifier (C-RNTI), the uplink grant information being used to schedule a hybrid automatic repeat request (HARQ) process of the uplink shared channel to be retransmitted; and
perform HARQ retransmission of the uplink shared channel according to the uplink grant information.

14. A random access apparatus, applicable to a terminal equipment, the apparatus comprising third processor circuitry, wherein the third processor circuitry is configured to:
receive two-step contention-free random access resource configuration transmitted by a network device for a first message (MsgA);
transmit to the network device the first message (MsgA) of a two-step contention-free random access procedure, the first message comprising a two-step contention-free random access preamble and a physical uplink shared channel; and
when receiving a second message (MsgB) transmitted by the network device, determine that the random access response is successfully received and consider this random access successfully completed,
wherein the receiving the second message (MsgB) transmitted by the network device comprises:
a media access control layer protocol data unit (MAC PDU) scheduled by a physical downlink control channel addressed to the second message radio network temporary identifier (MsgB-RNTI) is successfully demodulated, and a random access preamble identifier (RAPID) in a sub-protocol data unit (subPDU) in the media access control layer protocol data unit (MAC PDU) matches the two-step contention-free random access preamble transmitted by the terminal equipment, and
wherein the sub-protocol data unit (subPDU) at least contains a timing advance command (TAC).

15. The apparatus according to claim 14, wherein,
the subPDU further contains uplink grant information, and
the third processor circuitry further retransmits the uplink shared channel of the first message (MsgA) according to the uplink grant information.

16. The apparatus according to claim 13, wherein the third processor circuitry is further configured to:
when the second message (msgB) is not received and when the uplink grant information used for scheduling the retransmission of the physical uplink shared channel (PUSCH) is received, not retransmitting the physical uplink shared channel (PUSCH) according to the uplink grant information.

* * * * *